(12) United States Patent
Colle et al.

(10) Patent No.: US 11,927,542 B2
(45) Date of Patent: Mar. 12, 2024

(54) LINE FOR INSPECTING EMPTY GLASS CONTAINERS

(71) Applicant: TIAMA, Vourles (FR)

(72) Inventors: Olivier Colle, Oullins (FR); Laurent Cosneau, Soucieu-en-Jarrest (FR)

(73) Assignee: TIAMA, Saint-Genis-Laval (FR)

( * ) Notice: Subject to any disclaimer, the term of this patent is extended or adjusted under 35 U.S.C. 154(b) by 314 days.

(21) Appl. No.: 17/603,642

(22) PCT Filed: Apr. 21, 2020

(86) PCT No.: PCT/FR2020/050679
§ 371 (c)(1),
(2) Date: Oct. 14, 2021

(87) PCT Pub. No.: WO2020/221975
PCT Pub. Date: Nov. 5, 2020

(65) Prior Publication Data
US 2022/0196567 A1 Jun. 23, 2022

(30) Foreign Application Priority Data

Apr. 29, 2019 (FR) ...................................... 1904532

(51) Int. Cl.
*G01N 21/90* (2006.01)
*G01B 15/02* (2006.01)
(Continued)

(52) U.S. Cl.
CPC ....... *G01N 21/9054* (2013.01); *G01B 15/025* (2013.01); *G01N 23/083* (2013.01);
(Continued)

(58) Field of Classification Search
CPC ............. G01N 21/9054; G01N 23/083; G01N 2021/845; G01N 2223/04;
(Continued)

(56) References Cited

U.S. PATENT DOCUMENTS

| 4,075,086 A | 2/1978 | Marsh, III et al. |
| 4,293,219 A | 10/1981 | Ducloux |

(Continued)

FOREIGN PATENT DOCUMENTS

| DE | 197 56 697 | 7/1999 |
| DE | 10 2007 044530 | 4/2009 |

(Continued)

*Primary Examiner* — Jamil Ahmed
(74) *Attorney, Agent, or Firm* — Clark & Brody LP

(57) ABSTRACT

An inspection line comprises: at a finish inspection station, a finish inspection installation capable of detecting without contact, by light rays, check-type defects in the neck of the containers; at a base inspection station, a base inspection installation capable of detecting without contact, by light rays, check-type defects in the base of the containers; and at a radiographic measuring station, a radiographic installation for automatically measuring linear dimensions of at least one region to be inspected of containers. The three installations are each arranged at stations distinct from each other along a trajectory of displacement of the containers. In each installation, a section of the transport device ensures, in the inspection area of the installation, the transport of the containers along a rectilinear portion of the trajectory (T) in a horizontal conveying plane (Pc) perpendicular to the central axis of the containers.

21 Claims, 13 Drawing Sheets

(51) Int. Cl.
*G01N 23/083* (2018.01)
*G01N 21/84* (2006.01)

(52) U.S. Cl.
CPC ... *G01N 2021/845* (2013.01); *G01N 2223/04* (2013.01); *G01N 2223/1016* (2013.01); *G01N 2223/645* (2013.01); *G01N 2223/646* (2013.01)

(58) Field of Classification Search
CPC ..... G01N 2223/1016; G01N 2223/645; G01N 2223/646; G01B 15/025
See application file for complete search history.

(56) References Cited

U.S. PATENT DOCUMENTS

| | | | |
|---|---|---|---|
| 4,393,305 | A | 7/1983 | Shimizu et al. |
| 4,802,571 | A | 2/1989 | Born et al. |
| 5,864,600 | A | 1/1999 | Gray et al. |
| 2002/0078769 | A1 | 6/2002 | Giometti |
| 2003/0188953 | A1 | 10/2003 | Nickey et al. |
| 2004/0129614 | A1 | 7/2004 | Garin et al. |
| 2006/0058974 | A1 | 3/2006 | Lasiuk et al. |
| 2009/0158865 | A1 | 6/2009 | Dallongeville et al. |
| 2009/0262891 | A1 | 10/2009 | Zhang et al. |
| 2010/0102032 | A1 | 4/2010 | Bathelet |
| 2010/0110174 | A1 | 5/2010 | Leconte |
| 2010/0128120 | A1 | 5/2010 | Garin |
| 2010/0208972 | A1 | 8/2010 | Bouchard et al. |
| 2010/0282650 | A1 | 11/2010 | Venaille |
| 2010/0319400 | A1 | 12/2010 | Geisel |
| 2012/0004513 | A1 | 1/2012 | Robinson |
| 2012/0175224 | A1 | 7/2012 | Briggs et al. |
| 2013/0222575 | A1* | 8/2013 | Numazu ............ G01N 21/9036 348/127 |
| 2013/0247404 | A1 | 9/2013 | Garin et al. |
| 2014/0029019 | A1 | 1/2014 | Leconte |
| 2020/0299169 | A1 | 9/2020 | Cosneau et al. |
| 2020/0300619 | A1 | 9/2020 | Cosneau et al. |
| 2020/0333133 | A1 | 10/2020 | Cosneau et al. |

FOREIGN PATENT DOCUMENTS

| | | |
|---|---|---|
| EP | 0 320 139 | 6/1989 |
| EP | 0 584 673 | 3/1994 |
| EP | 2 434 276 | 3/2012 |
| FR | 1491418 | 8/1967 |
| FR | 2738343 | 3/1997 |
| FR | 2742545 | 6/1997 |
| FR | 3 052 555 | 12/2017 |
| GB | 1161641 | 8/1969 |
| GB | 1432120 | 4/1976 |
| JP | 60-260807 | 12/1985 |
| WO | 81/03706 | 12/1981 |
| WO | 00/43757 | 7/2000 |

* cited by examiner

[Fig. 1]
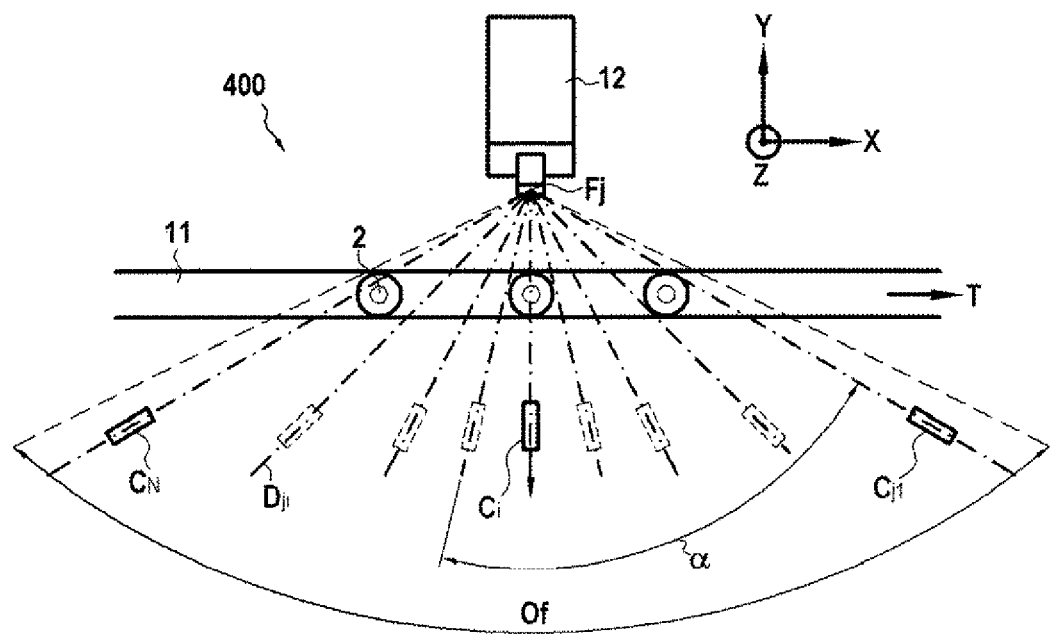
[Fig. 2]
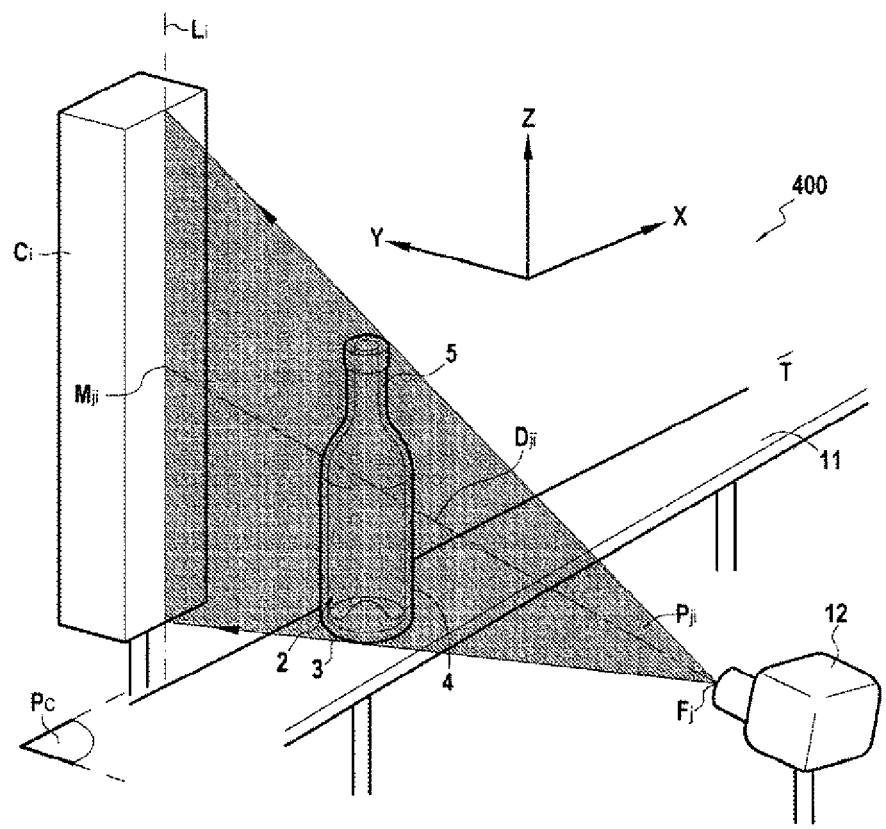

[Fig. 3]
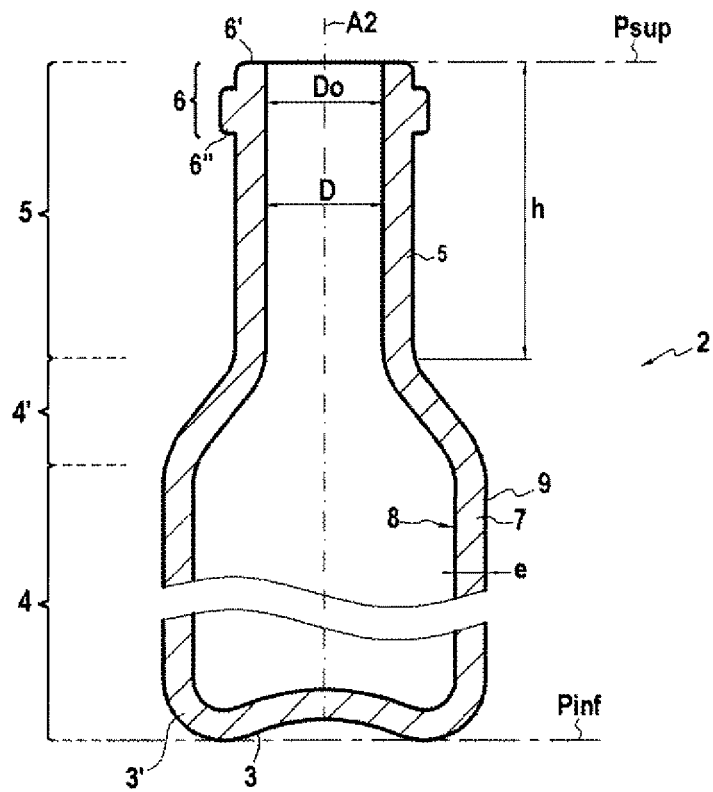
[Fig. 4]
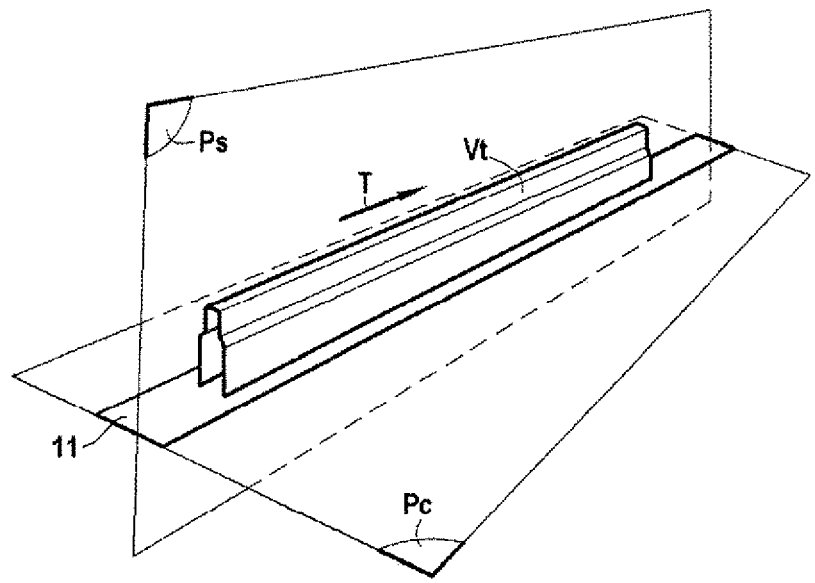

[Fig. 5]
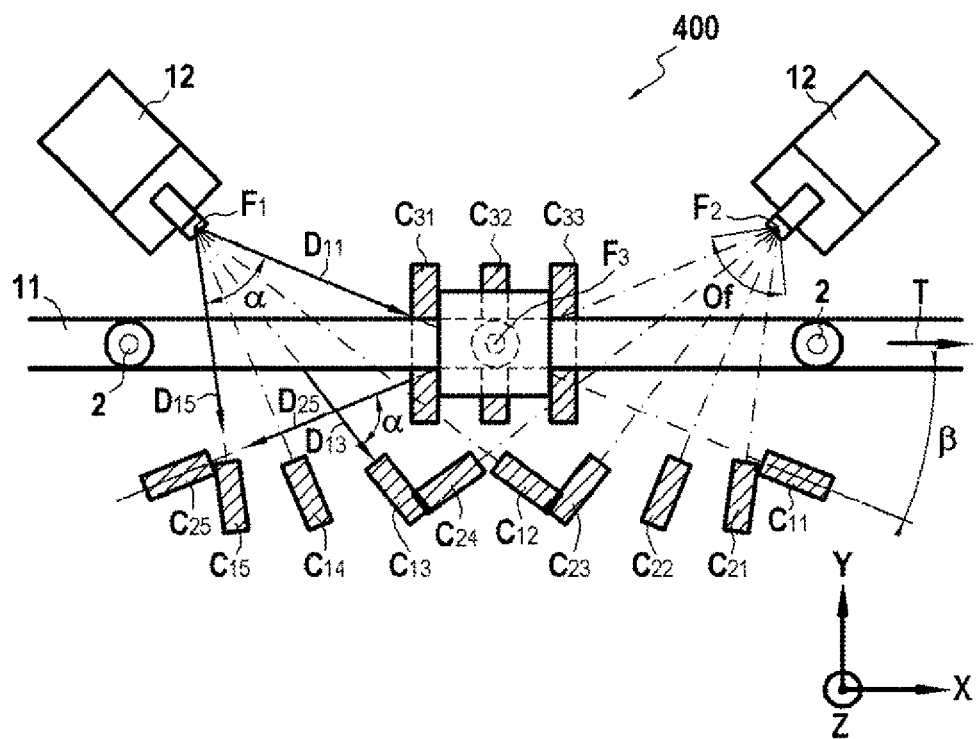
[Fig. 6]
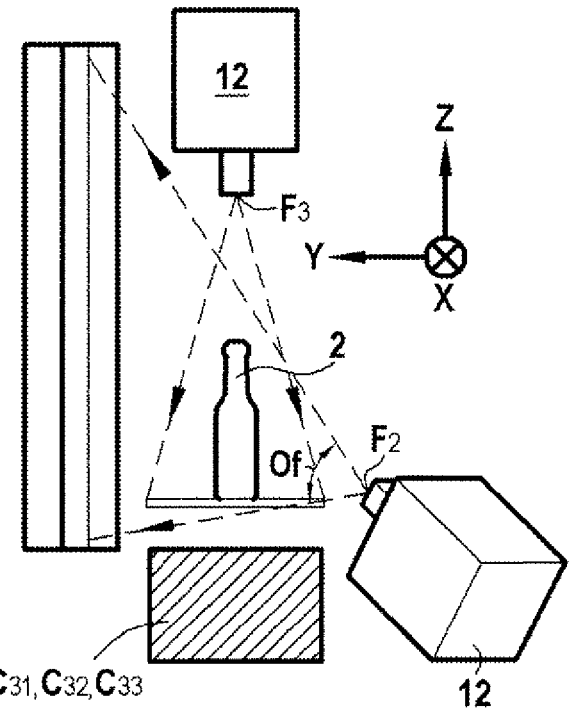

[Fig. 7]
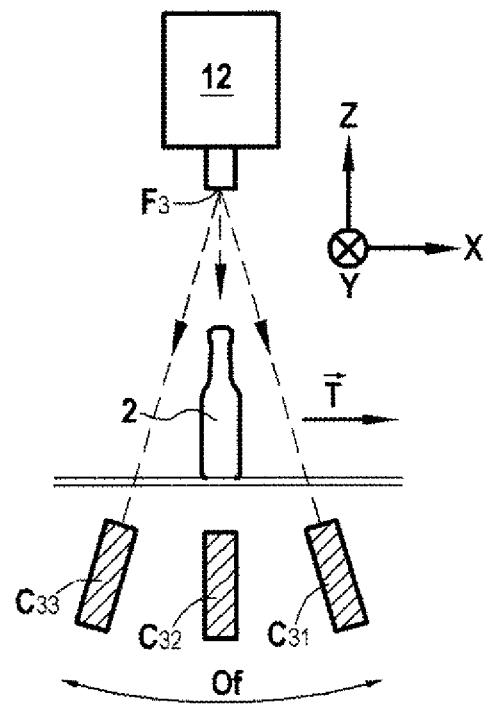
[Fig. 8]
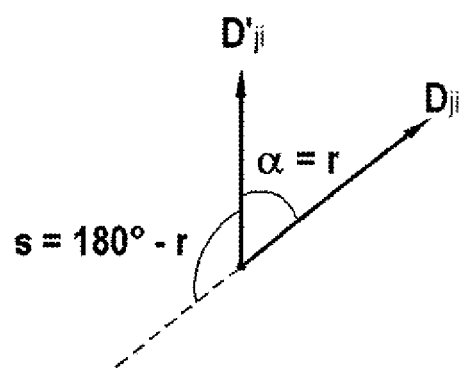

[Fig. 9]
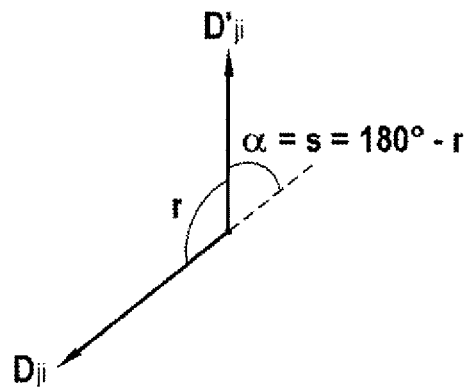
[Fig. 10]
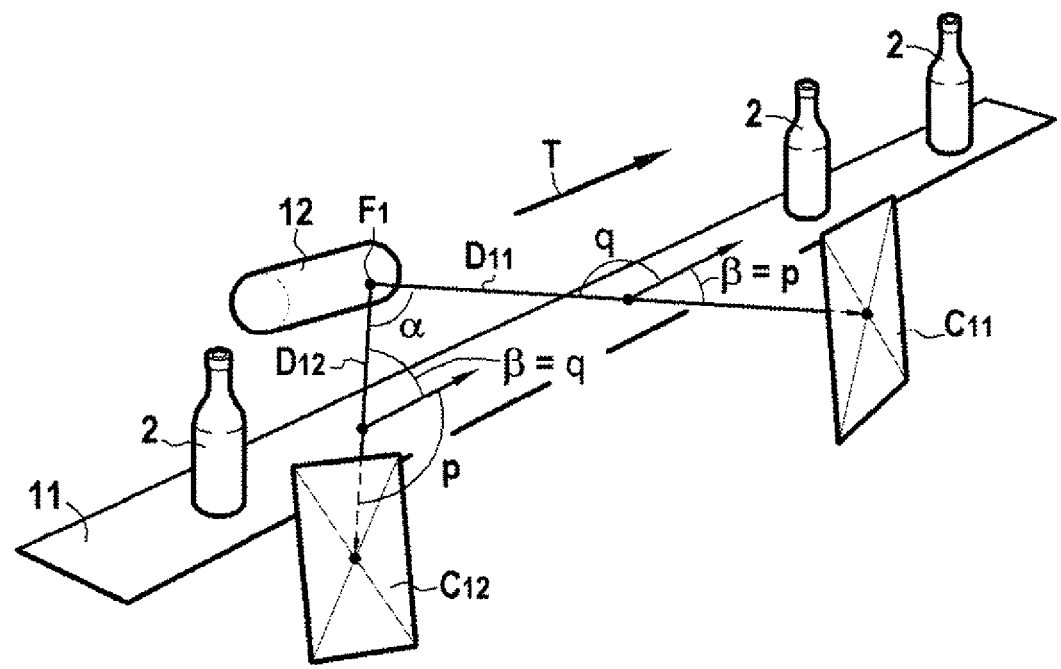

[Fig. 11]
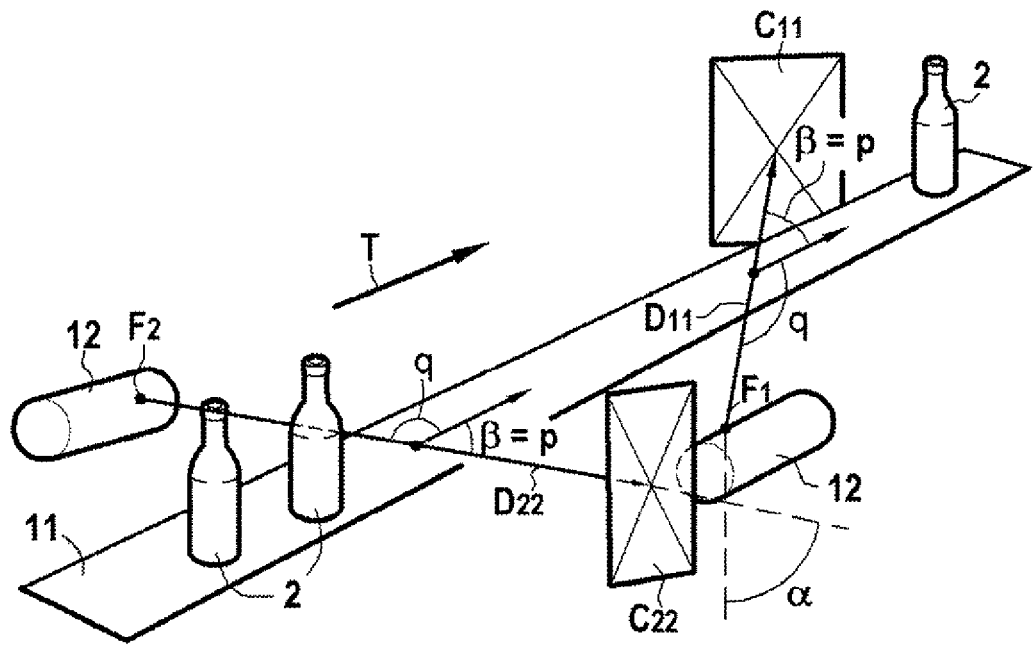
[Fig. 12]
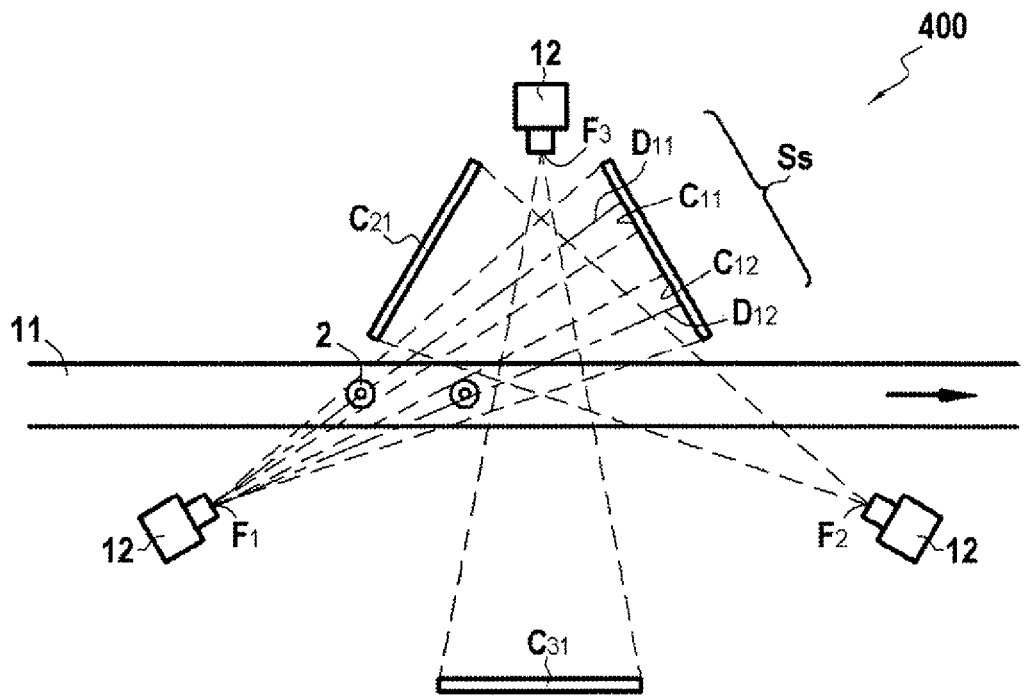

[Fig. 13]
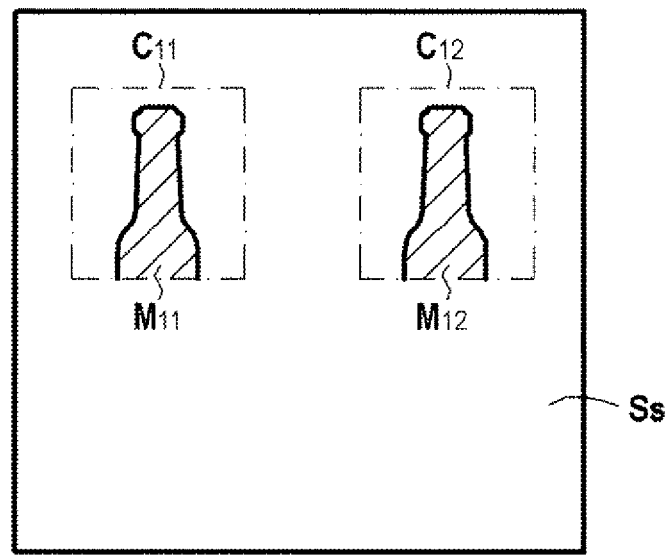
[Fig. 14]
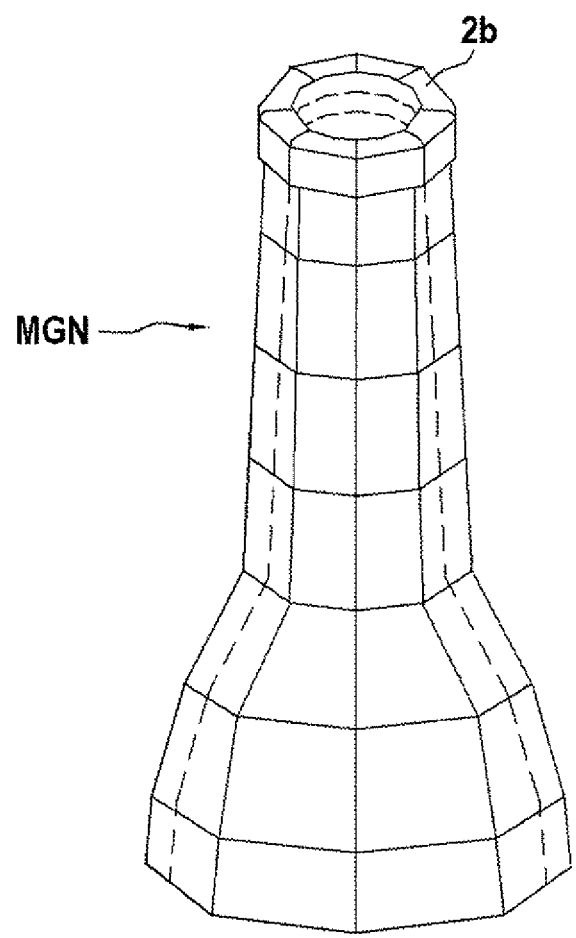

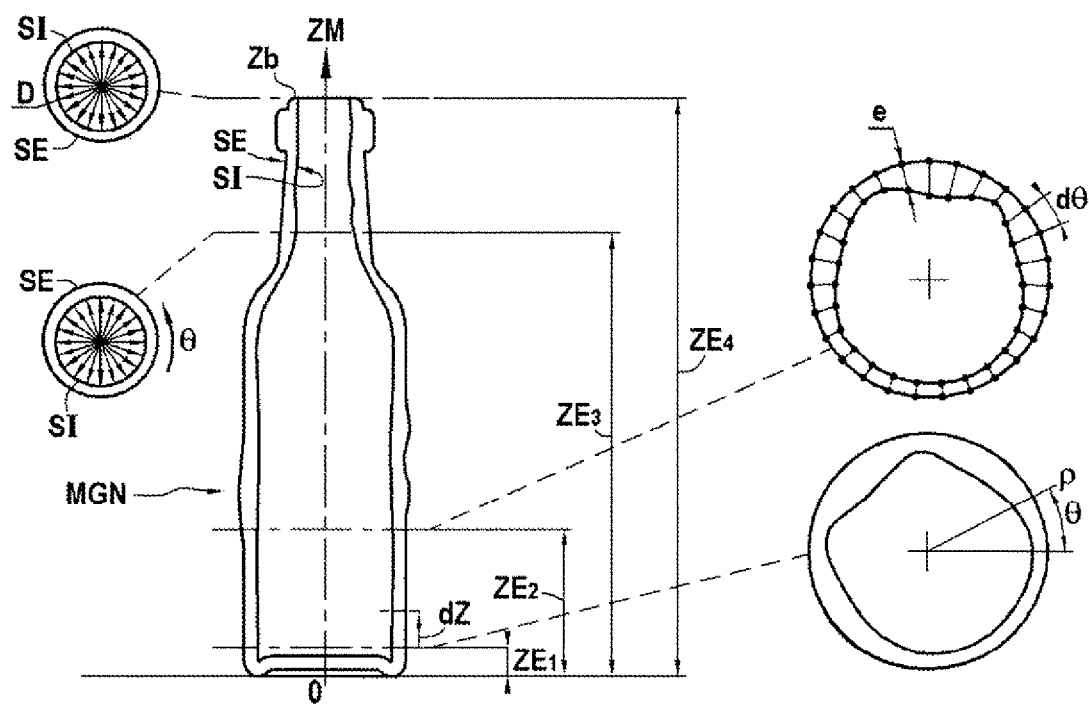
[Fig. 15]

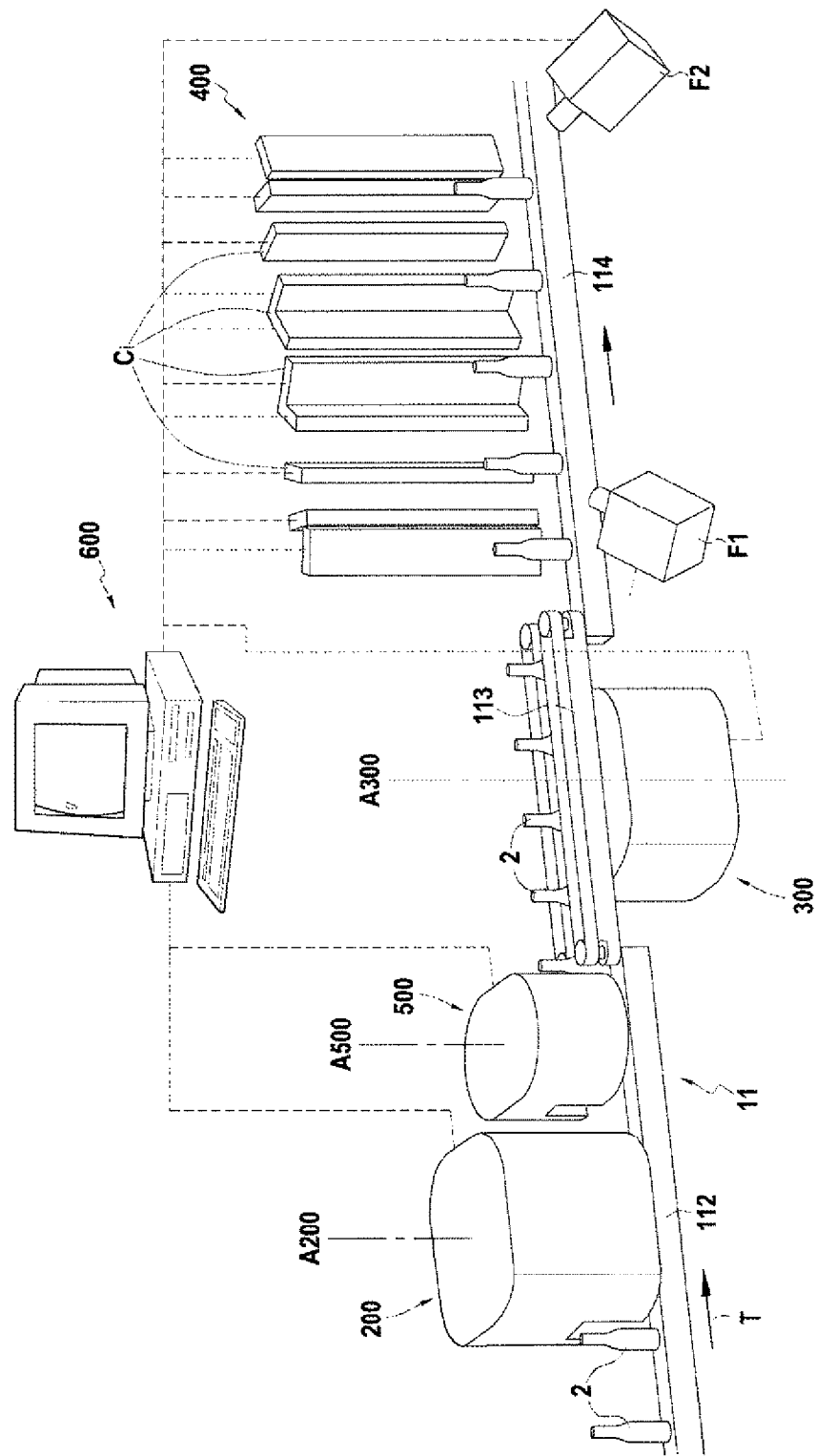
[Fig. 16]

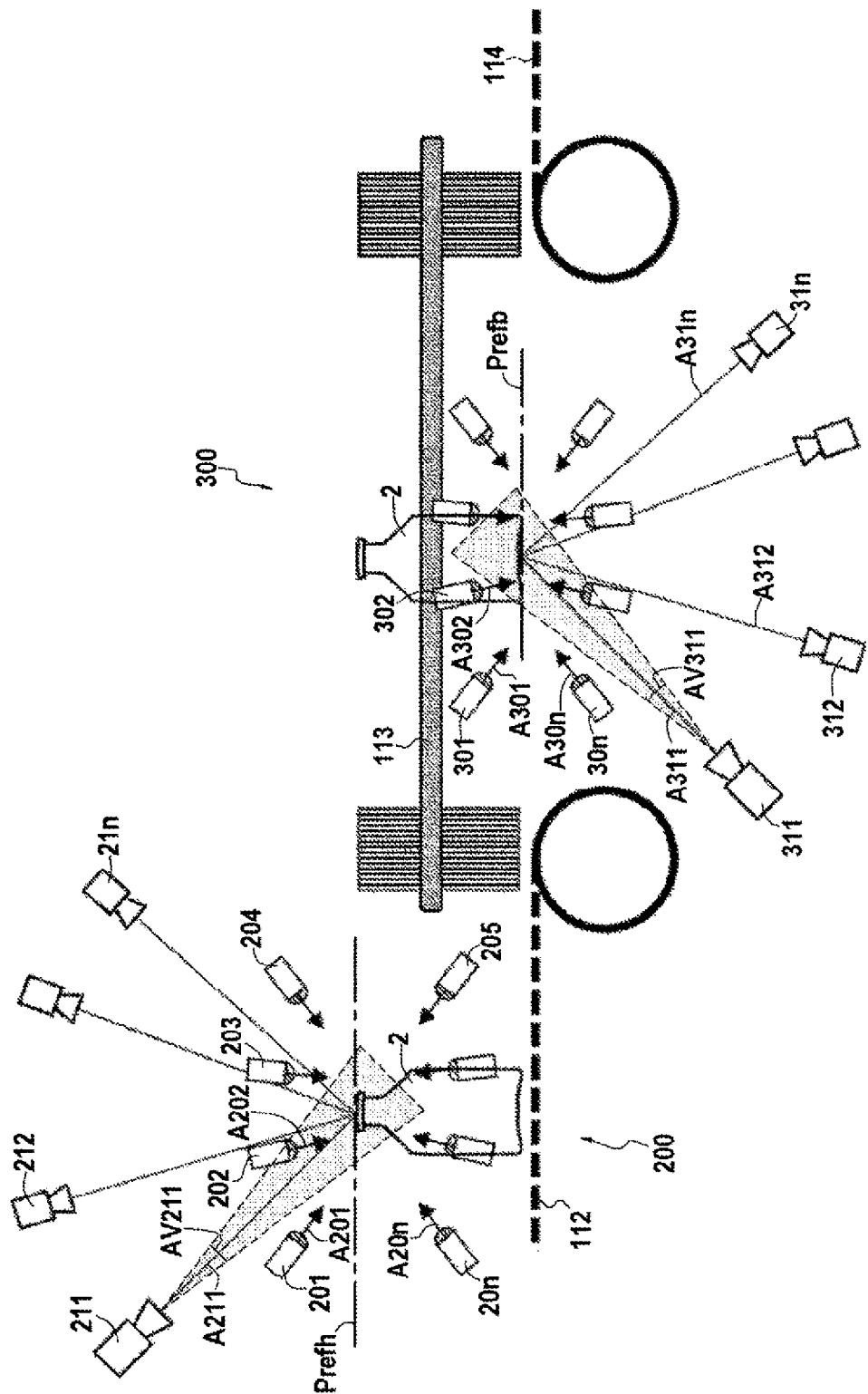
[Fig. 17]

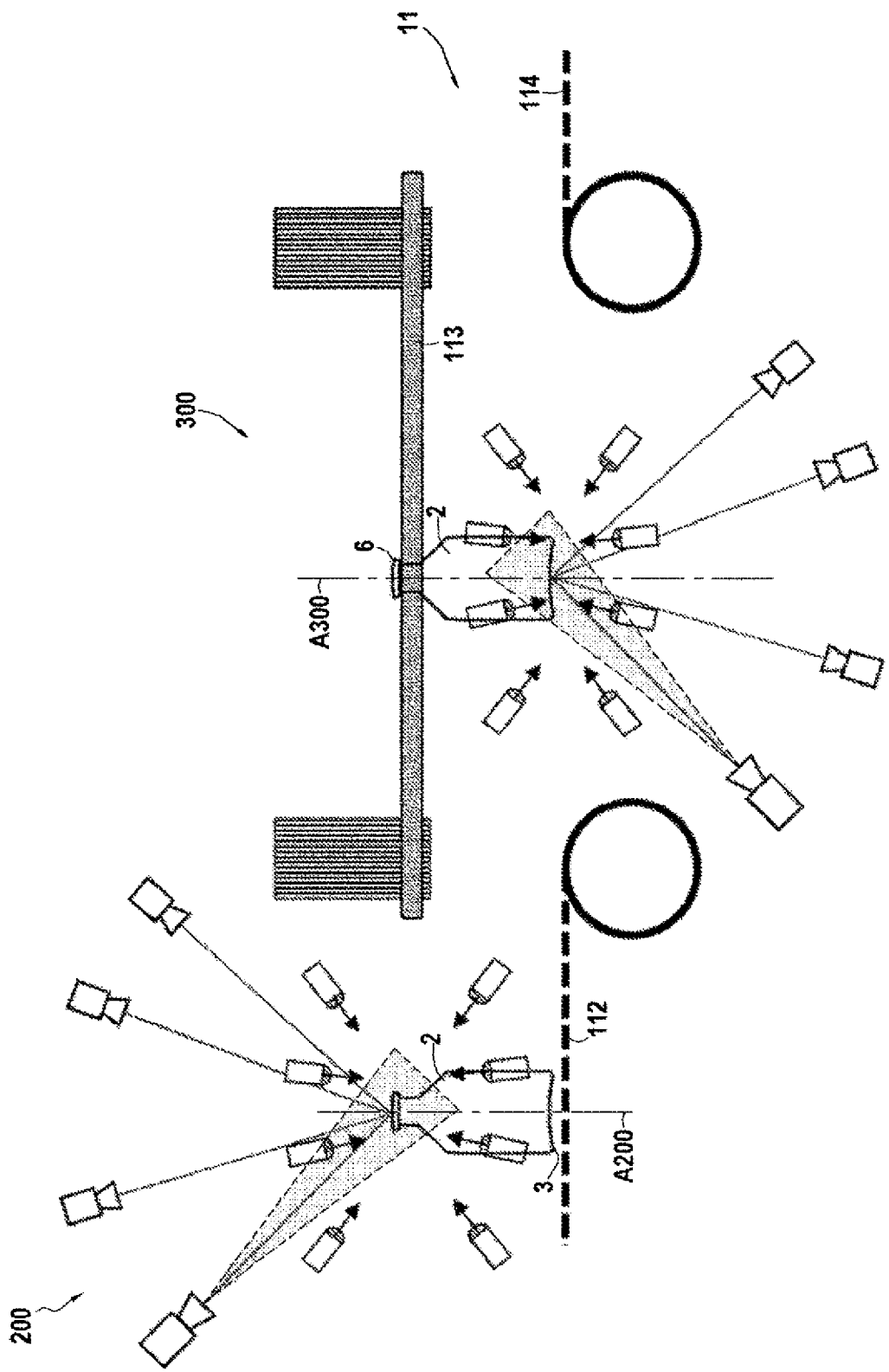
[Fig. 18]

[Fig. 19]
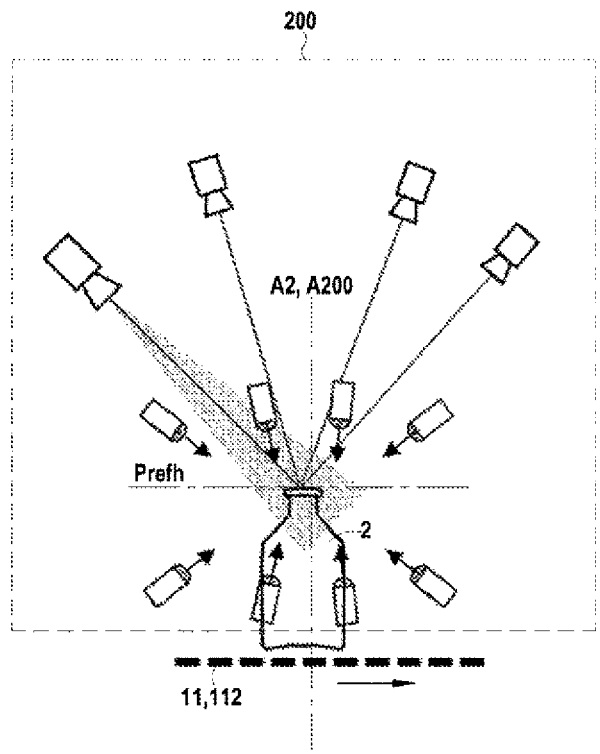
[Fig. 20]
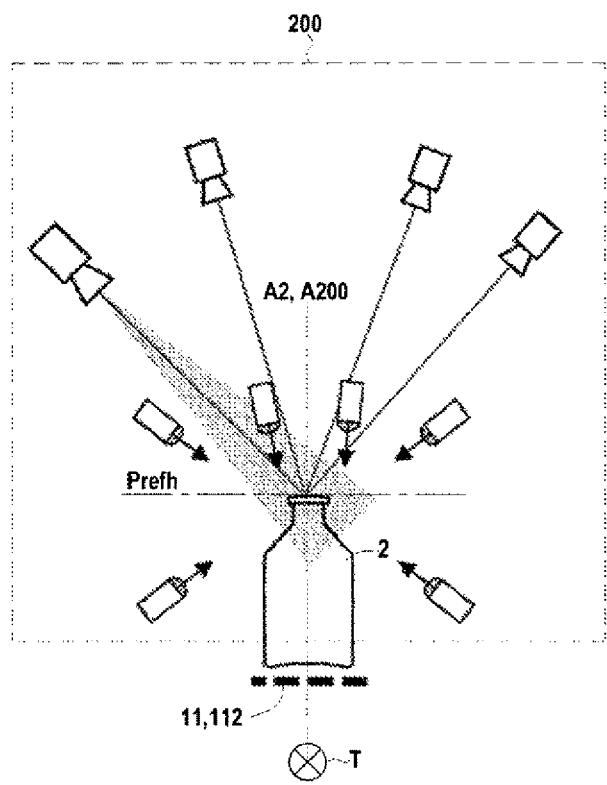

[Fig. 21]
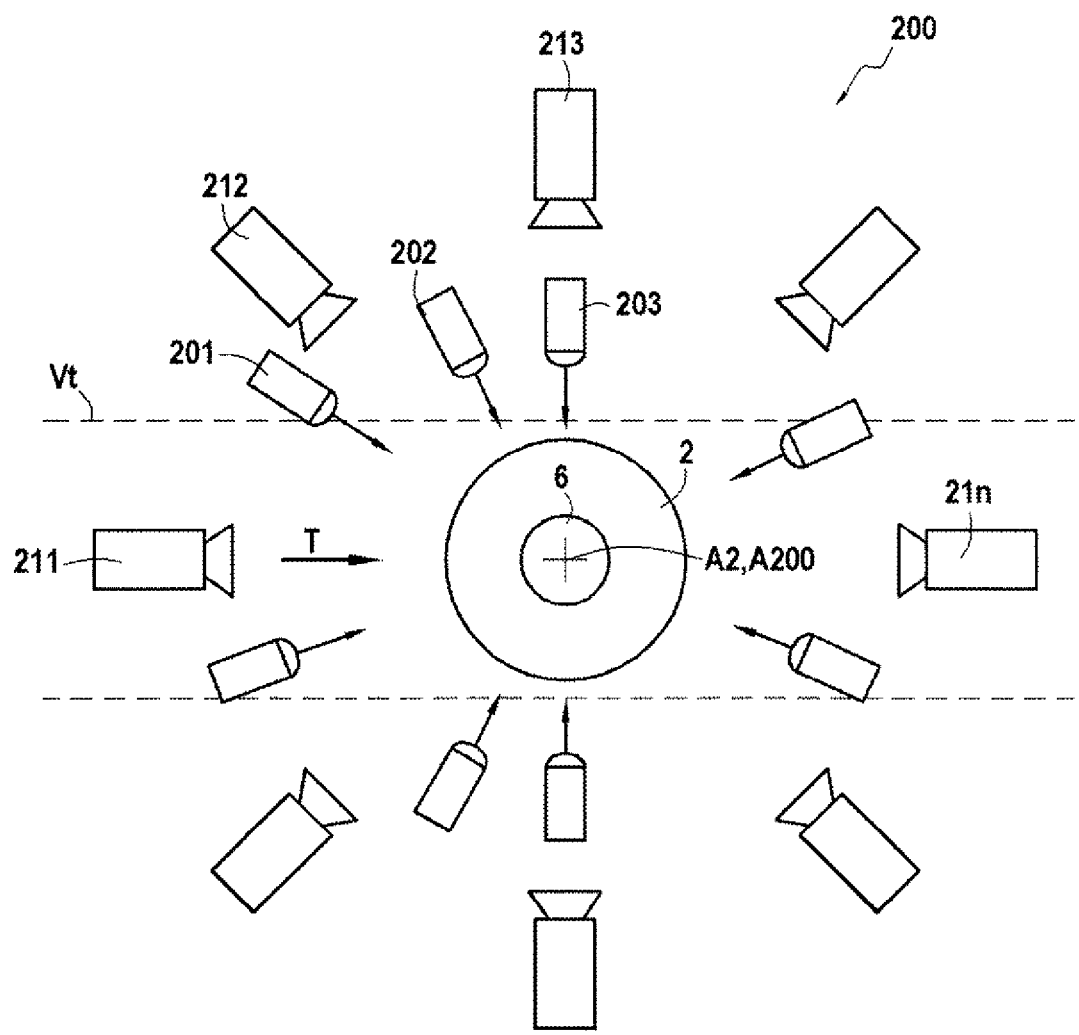

LINE FOR INSPECTING EMPTY GLASS CONTAINERS

TECHNICAL FIELD

The present invention relates to the technical field of the inspection of empty glass containers, such as for example bottles, jars, flasks with a view to detecting possible dimensional defects and possible check-type defects.

The present invention relates more specifically to the measurement of dimensions and to the inspecting of check-type defects on empty glass containers, traveling in line after their manufacture with a view to determining whether such containers meet required dimensional criteria and required criteria of absence of defects.

After their manufacture, the empty glass containers are subject to various inspections as to the presence of defects including the presence of checks or dimensional inspections.

Thus, it is known that there is a risk that the containers have one or several localized areas of poor distribution of glass affecting the aesthetics or more seriously, the mechanical strength of the containers. In addition, the presence of checks in a glass container is generally a serious quality problem as it almost always results in lower mechanical strength.

To measure the thickness of the wall of a container, it is known for example from patent EP 0 320 139 or patent EP 0 584 673, a method known as method by triangulation consisting in projecting a light beam on the wall of the container with a non-zero angle of incidence, and in collecting the light beams reflected from the external surface and the internal surface of the wall.

One alternative to the previous technique of optical measurement by triangulation is the measurement by the method called "chromatism confocal optical" method as described by the application DE 10 2007 044 530 or the application FR2738343A1. This method consists in sending a light beam having a chromatic coding, in recovering the beams reflected by the internal and external faces, on a sensor that allows analyzing the wavelength of said reflected beams, and in determining the thickness based on the wavelengths of said reflected beams.

Similarly, patent EP 2 676 127 describes a device for measuring the thickness of the glass wall of the containers at several measuring points distributed over an inspection region in a superimposed manner along a determined height of the container taken along the central axis. The inspection method aims to detect defects in the distribution of material in transparent containers having a central axis and a wall delimited between an outer surface and an inner surface.

The optical measurements described above are widely used because they are non-contact and quite fast measurements, but they all require rotating the containers in order to measure the thickness on a circumference. It is therefore not possible to use these principles for a measurement of containers traveling in line on a conveyor line during their manufacture.

Additionally, rotating the containers required for the optical thickness measurement is expensive. Indeed, the rotation requires the use of complex handling equipment. It is indeed necessary to stop the containers that arrive in translation on the conveyor, to drive them in rotation during the measurement and to put them back in translational movement on the conveyor. The containers are then brought into contact with guides, rollers, stars. The settings are tedious and involve the resort to equipment adapted to each container format (variable equipment). Finally, the rates are limited to 300-400 containers per minute, whereas the current production of glass containers on the most efficient lines currently exceeds 700 containers per minute. Double measuring equipment is therefore required in some cases.

Conventionally, the empty glass containers are also subject, apart from the thickness measurements of their wall, to measurements at the neck or the finish of the container (inner/outer diameters, sealing, height) and at the collar of the container (internal diameter, internal profile, broaching).

In order to carry out such inspections, it is known to use one or several devices each including an inspection head intended to be lowered either over an accurate distance depending on the nature of the container, or to come into contact with the container, or to bear on the container during the inspection. Conventionally, such an inspection is carried out using a machine having either a linear conveyor adapted to hold the containers in specific positions, or preferably a star-shaped conveyor, with an indexed circular movement to place the containers in relation with different inspection stations. Each inspection head is moved along a vertical reciprocating movement for a star-shaped conveyor while for a linear conveyor, the inspection head additionally has a horizontal displacement.

Patent FR 2 818 748 describes an inspection device including a head mounted on a horizontal slide which is fixed to a carriage moved along vertical reciprocating movements by a belt mounted between a loose pulley and a pulley driven by a servomotor. One of the drawbacks of such a device is the relatively large moved mass, which limits the speed and the acceleration of displacement of the inspection head. As a result, the inspection rate of the containers is limited, which is a major drawback in the in-line container production process. Another drawback of such a known device arises when the inspection head is intended to come into contact with the container. Indeed, the stroke of the inspection head is not defined because of the height dispersion of the containers and of the defects which affect this stroke such as those that do not allow the inspection head to move down during a broaching operation. Also, given the indeterminacy of this stroke and of the embedded mass, a significant impact between the inspection head and the container may happen, which could lead to the deterioration of the container and/or of the inspection head.

GB patent 1 432 120 describes a device for inspecting the containers including several inspection stations, one of which aims to inspect the dimensional conformity of the finishes and of the collars of the containers. This inspection station includes a movable gear driven by a motorization system along a reciprocating movement relative to the frame of the device, in a direction of displacement parallel to the axis of symmetry of the containers. This movable gear is equipped with an outer gauge for inspecting the outside of the finish of the containers and an inner gauge for inspecting the inside of the finish and of the collar of the containers. The device described by this document GB 1 432 120 has the same drawbacks as the inspection device described by patent FR 2 818 748.

Patent FR 2 965 344 by lightening the movable part, by combining a contact detection and a dynamic command of the vertical movement, makes the solution significantly faster, nevertheless the mechanical movements of handling of the containers, the variable equipment and the contact of the gauges with the containers remain major drawbacks. EP-2.622.305 also describes a machine implementing gauges which come into contact with the container.

In the field of detection of a volume of liquid contained in a container, patent application WO 2010/025539 describes an X-ray inspection system and method. The principle of detection of this document is to know the thickness of traversed liquid from the radiographic image (reference 512 in FIGS. 5*a* and 592 in FIG. 5*b*) in order to deduce therefrom the filling level (meniscus 520) and therefore the total volume of liquid inside the container. To this end, the method proposes to subtract from the radiographic image, the attenuation due to the traversed glass thicknesses 508 and 506.

However, it is not possible in the radiography projected along the direction 502-504 to know the attenuation due to the glass and the attenuation due to the contained liquid. To address this problem, this document proposes to create a three-dimensional theoretical model of the container from its two-dimensional radiographic image. From the radiographic image, the attenuation of the three-dimensional theoretical model of the container is subtracted to deduce measured attenuations, only the attenuations of the liquid that allow approximately deducing therefrom the volume of liquid.

According to the exemplary embodiment described by this document, the three-dimensional theoretical model is obtained from a radiography produced along a single direction of projection. The radiography is analyzed to know the two-dimensional profile of the container projected along a direction of projection. The two-dimensional profile of the container is used to obtain the three-dimensional theoretical shape of the container either from a library of recorded models or by revolution of the two-dimensional profile given the supposed axial form of symmetry of the containers.

According to another exemplary embodiment, this document suggests taking radiographic images along different directions in order to improve the accuracy of the determination of the position of the meniscus of the liquid. According to this example, the method aims to determine the position of the meniscus of the liquid along a first radiographic direction, the position of the meniscus of the liquid along a second radiographic direction and to retain the position of the meniscus of the liquid for the average position of the meniscus of the liquid.

Regardless of the exemplary embodiment, the three-dimensional theoretical model constructed according to the teaching of this document does not correspond to the actual container object of the radiography. Measurements, in particular of thicknesses, made on such a three-dimensional theoretical model are therefore false. Furthermore, it should be noted that the sole possible thickness measurements are those along a direction orthogonal to the direction of radiographic projection. Thus, the dimensions such as the glass thickness in the directions not orthogonal to the direction of radiographic projection are exactly the same as the thicknesses in the two-dimensional profile, therefore in the directions orthogonal to the radiographic projections. This assumption, which is verified only for a perfect or theoretical container as assumed in this document, is of course false for a container on which accurate measurements are to be performed.

Patent application JP S60 260807 proposes to measure the thickness of the walls of a tube moving in translation along the axis of the tube, using measurements by X-rays derived from one or several focal points to each of which sensors are associated. The focal points and the sensors are positioned to produce radiographic projections along a plane orthogonal to the direction of displacement of the tube. The radiographic projections are therefore coplanar in a projection plane which is orthogonal to the axis of symmetry of the tube. The direction of these radiographic projections forms a right angle (90°) relative to the direction of displacement. This technique does not allow completely knowing the inner and outer surfaces of the tube. The method described by this patent application allows measuring only the cumulative thickness of the two walls of the tube in the direction of projection, without reconstructing a three-dimensional model of a tube which would allow performing accurate measurements in the other directions.

Likewise, patent U.S. Pat. No. 5,864,600 describes a method for determining the filling level of a container using an X-ray source and a sensor disposed transversely on either side of the container transport conveyor. This method allows measuring the cumulative thickness of the material. This system does not allow performing measurements for a non-transversely oriented surface because this document does not provide a three-dimensional modeling of the containers.

Patent application US 200910262891 describes a system for detecting by X-rays, objects placed in luggage items moved in translation by a conveyor. This system includes pulsed generator tubes or a sensor having a large dimension parallel to the way of travel. This document provides a method for reconstructing the object that is unsatisfactory because the absence of projections in the direction of displacement does not allow the measurement of dimensions in the direction orthogonal to the way of displacement. The lack of radiographic projections in an angular sector does not allow producing a digital model adapted to ensure accurate measurements.

Patent application DE 197 56 697 describes a device having the same drawbacks as patent application US 2009/0262891.

Patent application WO 2010/092368 describes a device for displaying an object moving in translation by X-rays using a radiation source and three linear sensors.

Patent application US 2006/0058974 describes a digital radiography imaging system that allows acquiring digital images particularly of tanks or pipes and transforming these digital images into a map of absolute thickness characterizing the inspected object. The digital data generated from each sensitive element are calibrated, for example, by correcting the variations in the X-ray paths between the X-ray source and the detector, by correcting the variations in the spatial frequency response, by correcting the variations of the geometric profile of the object under inspection and by correcting the material contained in and/or around the object. This technique cannot be implemented for the dimensional inspection of containers traveling in line.

The analysis of the prior technical solutions leads to the observation that there is a need for a new technique that allows performing dimensional measurements on containers without altering their integrity while maintaining high conveying speed to these containers.

The present invention aims to meet this need by proposing a new non-contact measurement technique that allows performing accurate dimensional measurements on containers traveling in line at high rate.

Checks are defects in the thickness of the wall of the containers that reflect light. They are generally inspected with light reflection on the defect. To detect checks, a region of the item is illuminated, under accurate incidences, by means of projectors emitting, in the direction of said region, directed light beams (convergent or slightly divergent light beams). The illuminated region is observed by means of light sensors, for example photodiodes as in EP0053151, photodiode arrays, or image sensors such as linear or matrix cameras as in EP1147405 and EP2082217. This observation is made from accurate observation angles such that the incident light reflected by a check-type defect will be collected/observed by the light sensors, which will receive light only upon passage of a check during the rotation of the item around its vertical axis. Indeed, the known detections generally involve rotating the item to be inspected around a central axis, at least at 360 degree angle.

However, there are devices that allow a detection of some checks when the item is in translation. Document U.S. Pat. No. 4,293,219 gives a solution without camera. In this solution, the sensors each contain a single photosensitive element collecting all the reflected light perceived in a receiving cone defined by the focal length of its lens and its opening. It is impossible to distinguish the shape of the observed reflective objects, nor their accurate location in the field of the sensors, so that it is not possible to discriminate the small objects, that is to say, to differentiate between a small check and a small parasite.

The ARGOS machine, marketed by the Applicant, is a machine for detecting checks in translation with cameras that does not require the rotation of the item around its central axis. The cameras improve the detection, since images of each lighted region are produced. It is intended to detect checks on the finish and on part of the shoulder of a container. It implements a lighting and observation head, in which the emitters of directed light and the endoscope heads are organized based on the finish diameter of the item. The lighting and observation head forms a tunnel through which the neck of the containers circulates during the translation of the latter through the installation for inspection. Endoscopes are used to reduce a number of images, acquired along various viewing directions, to a small number of sensors. For example, all the endoscopes intended for the detection of vertical checks (by clockwise or counterclockwise tangential illumination) are connected to a single camera. Only one image acquisition per item is made for a given type of checks.

Document EP2434276 describes a machine which detects checks on the neck of a container by combining 2 orthogonal translations, since a vertical translation combines with the horizontal translation of travel, therefore not in simple translation. A handling device must be provided to allow a vertical displacement. However, this device is bulky and takes up space around the containers, hiding parts of the container that cannot be inspected, at least in the case of containers of small height.

One of the objectives of the invention is to propose an inspection line which is capable of detecting possible checks in the neck and the base of the container and which is capable of measuring at least one inner diameter of the neck and/or at least one thickness of the wall of the container body in a context of high-speed container inspection.

DISCLOSURE OF THE INVENTION

The invention proposes a line for inspecting empty glass containers of a series.

Each container of the series having a wall which is delimited by an inner surface and an outer surface, which has a central axis, and which forms, from top to bottom along the central axis: a neck ending with a finish, an upper face of which defines an upper plane of the container, perpendicular to the central axis, a shoulder, a body, and a container base which defines a lower plane of the container, perpendicular to the central axis.

The inspection line includes a transport device which ensures, by contact with at least one contact region of the containers, the transport of the containers along a trajectory of displacement, the containers traveling through an extended conveying volume along the trajectory of displacement.

The inspection line comprises several installations each arranged at stations distinct from each other along the trajectory of displacement.

At a finish inspection station, a finish inspection installation is capable of detecting without contact, by light rays, check-type defects in the neck (5) of the containers. The installation (200) includes:
 a1) an inspection area of the finish inspection installation, in which the neck of a container must be located in order to be inspected, said area including a top reference plane intended to coincide with the upper plane of the container under inspection and including a reference axis intended to coincide with the central axis of the container for a position of the container under inspection;
 a2) a section of the transport device which ensures, in the inspection area of the installation, the transport of the containers along a rectilinear portion of the trajectory of displacement, in a horizontal conveying plane perpendicular to the central axis of the containers;
 a3) a series of several directional light emitters which are angularly distributed around the reference axis of the installation and which each deliver, in the direction of the inspection area of the installation, a directional light beam along an beam axis specific thereto, such that the inspection area is lighted by the directional light beams at a multitude of distinct azimuth angles in projection in the top reference plane;
 a4) several light receivers which are angularly distributed around the reference axis of the installation and which each have an axis of view and a field-of-view angle α round this axis of view;
 a5) with optical elements arranged on either side of the associated reference plane, these optical elements belonging either to light emitters of the installation or to light receivers of the installation, but all outside the conveying volume.

At a base inspection station, a base inspection installation is capable of detecting without contact, by light rays, check-type defects in the base of the containers. The installation includes:
 b1) an inspection area of the base inspection installation in which the base of a container must be located in order to be inspected, said area including a bottom reference plane intended to coincide with the lower plane of the container under inspection and including a reference axis intended to coincide with the central axis of the container for a position of the container under inspection;
 b2) a section of the transport device which ensures, in the inspection area of the installation, the transport of the containers along a rectilinear portion of the trajectory of displacement, in a horizontal conveying plane perpendicular to the central axis of the containers;
 b3) a series of several directional light emitters which are angularly distributed around the reference axis of the installation and which each deliver, in the direction of the inspection area of the installation, a directional light beam along a beam axis specific thereto, such that the inspection area is lighted by the directional light beams at a multitude of distinct azimuth angles in projection in the bottom reference plane;

b4) several photosensitive receivers which are angularly distributed around the reference axis of the installation and which each have an axis of view and a field-of-view angle α round this axis of view;

b5) with optical elements arranged on either side of the associated bottom reference plane, these optical elements belonging either to light emitters of the installation or to light receivers of the installation, but all outside the conveying volume.

At a radiographic measuring station, a radiographic installation capable of automatically measuring linear dimensions of at least one region to be inspected of containers, this installation having:

c1) at least one focal point of an X-ray generating tube located outside the traversed volume, and creating a divergent X-ray beam directed to pass through at least one region to be inspected comprising at least part of the neck and/or part of the body of the container;

c2) a section of the transport device which ensures, in the inspection area of the installation, the transport of the containers along a rectilinear portion of the trajectory of displacement, in a horizontal conveying plane perpendicular to the central axis of the containers, c3) one or several radiographic image sensors, located outside the conveying volume, so as to receive X-rays derived from a focal point, the focal point(s) and the radiographic image sensors (Ci) being disposed such that each image sensor receives the radiographic projection of the region to be inspected by the rays derived from the focal point when the container passes through these rays, the directions of radiographic projection of these radiographic projections being different from each other;

c4) an acquisition system connected to the radiographic image sensors, so as to acquire for each container during its displacement, at least three radiographic images of the region to be inspected, obtained from at least three radiographic projections of the region to be inspected, with different directions of radiographic projection;

c5) a computer system analyzing the at least three radiographic images, derived from at least the three different radiographic projections, so as to determine at least one inner diameter of the neck in a plane not orthogonal to a direction of radiographic projection, and/or at least one thickness of the body wall in a plane not orthogonal to a direction of radiographic projection.

Other characteristics of an inspection line according to the invention, which are optional but which can be combined with each other, are developed in the following paragraphs.

it can include, at a shoulder and/or body inspection station, distinct from the finish inspection, base inspection and radiographic measuring stations, a shoulder and/or body inspection installation capable of detecting without contact, by light rays, check-type defects in the shoulder and/or body of the containers, the installation including:

d1) an inspection area of the shoulder and/or body inspection installation in which the shoulder and/or the body of a container must be located in order to be inspected, said area including an intermediate reference plane intended to cut the shoulder and/or the body of the container under inspection and including a reference axis intended to coincide with the central axis of the container for a position of the container under inspection;

d2) a section of the transport device which ensures, in the inspection area of the installation, the transport of the containers along a rectilinear portion of the trajectory of displacement, in a horizontal conveying plane perpendicular to the central axis of the containers;

d3) a series of several directional light emitters which are angularly distributed around the reference axis of the installation and which each deliver, in the direction of the inspection area of the installation, a directional light beam along a beam axis specific thereto, such that the inspection area is lighted by the directional light beams at a multitude of distinct azimuth angles in projection in the intermediate reference plane;

d4) several light receivers which are angularly distributed around the reference axis of the installation and which each have an axis of view and a field-of-view angle α round this axis of view;

d5) with optical elements arranged on either side of the intermediate reference plane, these optical elements belonging either to light emitters of the installation or to light receivers of the installation, but all outside the conveying volume.

In each of the inspection areas of the finish inspection, base inspection and radiographic measuring installations, the transport device preferably ensures, in the inspection area of the installation, the transport of the containers along the trajectory of displacement without controlled rotation around their central axis.

In each of the inspection areas of the finish inspection, base inspection and radiographic measuring installations, the transport device preferably ensures, in the inspection area of the installation, the transport of the containers along the trajectory of displacement such that they are stationary in rotation around their central axis.

Between each of the finish inspection, base inspection and radiographic measuring installations, the transport device preferably ensures the transport of the containers along the trajectory of displacement without controlled rotation around their central axis.

The transport device can be formed, at each of the stations, by an associated conveying section of the transport device which ensures the transport of each container through the station while being in contact with the container, and one of the conveying sections associated respectively with the finish inspection, base inspection and radiographic measuring stations ensures a contact with a first contact region of the containers, while another of the conveying sections associated respectively with the finish inspection, base inspection and radiographic measuring stations ensures a contact with a second contact region of the containers which is distinct from the first contact region.

In each station, the area of contact of the containers with the section of the transport device which is preferably associated with this station is distinct from the area to be inspected of the containers at this station.

In each of the finish inspection, base inspection and radiographic measuring installations, the transport device ensures the transport of the containers, preferably without vertical displacement.

The transport device ensures the transport of the containers preferably without vertical displacement in the inspection line, neither in the three finish inspection, base inspection and radiographic measuring stations, nor between the finish inspection, base inspection and radiographic measuring stations.

The containers are preferably conveyed without controlled rotation around their central axis, neither in the three finish inspection, base inspection and radiographic measuring stations, nor between the finish inspection, base inspection and radiographic measuring stations.

The finish inspection installation can include optical elements of directional light emitters arranged above the top reference plane and optical elements of light emitters arranged below the top reference plane, but outside the conveying volume.

The finish inspection installation can include optical elements of light receivers arranged above the top reference plane and optical elements of light receivers arranged below the top reference plane, but outside the conveying volume.

The base inspection installation can include optical elements of directional light emitters arranged below the bottom reference plane and optical elements of directional light emitters arranged above the bottom reference plane, but outside the conveying volume.

The base inspection installation can include optical elements of light receivers arranged below the bottom reference plane and optical elements of light receivers arranged above the bottom reference plane, but outside the conveying volume.

The inspection installation can include directional light emitters which are distributed such that the inspection area is lighted by the directional light beams at a multitude of distinct elevation angles relative to the reference plane.

Each container of the series of containers can carry a unique identifier. The inspection line can then include at least one reader of the unique identifier of the containers inspected by the inspection line, and can include a computer system which receives:

from the finish inspection installation, at least one finish inspection information for the inspected container;
from the base inspection installation, at least one base inspection information for the inspected container;
from the radiographic measuring installation, at least one linear dimension measurement for the inspected container.

In this case, the computer system of the inspection line can be configured to create a computer report linking the unique identifier of a container, the at least one finish inspection information, the at least one base inspection information and the at least one measurement for that inspected container, and to store this computer report in an electronic memory.

The computer system of the inspection line can receive, from the shoulder and/or body inspection installation, at least one shoulder and/or body inspection information for the inspected container which is related to the other information in the computer report.

The computer system of the inspection line can be configured to perform a computer processing on the computer reports of a group of containers of the series.

The computer system of the inspection line can be configured to control a corrective action on a parameter of production of the containers, based on a computer processing on the computer reports of a group of containers of the series.

The determination of at least one inner diameter of the neck and/or at least one thickness of the body wall can include the construction, for each container, of a digital geometric model of the region to be inspected of the container.

Said digital geometric model can contain the three-dimensional coordinates of a set of points, calculated from the at least three radiographic images, this set of points belonging to the inner and/or outer surface of the wall of the container, with at least two points located in a plane not orthogonal to a direction of radiographic projection, and the at least one inner diameter of the neck, and/or the at least one thickness of the wall of the measured body can be measured on the digital geometric model in a plane not orthogonal to a direction of radiographic projection.

BRIEF DESCRIPTION OF THE DRAWINGS

FIG. 1 is a schematic top view showing a radiographic installation that allows the X-ray measurement of dimensions on containers traveling in line.

FIG. 2 is a schematic perspective side view showing a radiographic installation that allows the X-ray measurement of dimensions on a container FIG. 3 is a schematic sectional view showing part of an inspected container.

FIG. 4 is a schematic perspective view showing the volume traversed or generated by the containers during their linear displacement.

FIG. 5 is a schematic top view showing an exemplary embodiment of one installation in accordance with the invention including three X-ray generating focal points.

FIG. 6 is a schematic cross-sectional elevation view of the installation illustrated in FIG. 5.

FIG. 7 is a schematic side elevation view of the installation illustrated in FIG. 5.

FIG. 8 is a schematic view explaining the definition of the effective angle between two directions of projection.

FIG. 9 is a schematic view explaining the definition of the effective angle between two directions of projection.

FIG. 10 is a schematic perspective view showing the positioning of image sensors relative to the displacement of the containers to be inspected.

FIG. 11 is a schematic perspective view showing the positioning of image sensors relative to the displacement of the containers to be inspected.

FIG. 12 is a view of an exemplary embodiment of an installation in accordance with the invention, implementing matrix image sensors.

FIG. 13 is a view of a matrix of X-ray sensitive elements on which two distinct areas corresponding to two matrix image sensors appear.

FIG. 14 is a view of a digital geometric model of a container obtained according to the method in accordance with the invention, when the inspection region comprises the neck.

FIG. 15 shows a vertical section and four horizontal sections of the digital geometric model of a container obtained according to the method in accordance with the invention and on which measurements of dimensions are represented.

FIG. 16 is a schematic perspective view showing an exemplary embodiment of an inspection line according to the invention.

FIG. 17 is a schematic view showing an exemplary embodiment of part of an inspection line according to the invention, transversely to a direction of displacement of the containers.

FIG. 18 is a schematic view showing another exemplary embodiment of part of an inspection line according to the invention, transversely to a direction of displacement of the containers.

FIG. 19 is a schematic view showing one exemplary embodiment of a finish inspection installation, transversely to a direction of displacement of the containers.

FIG. 20 is a schematic view showing an exemplary embodiment of a finish inspection installation, in the way of the direction of displacement of the containers.

FIG. 21 is a schematic top view showing an exemplary embodiment of a finish inspection installation.

DESCRIPTION OF THE EMBODIMENTS

As a preliminary matter, some definitions of the terms used within the scope of the invention are given below.

A focal point Fj of an X-ray generating tube is a point X-ray source, preferably a "micro focal point", with a diameter for example between 0.01 mm and 1 mm, creating a divergent X-ray beam. It is possible to use any type of point or quasi point X-ray source.

A photographic, respectively radiographic, sensitive element of a sensor of photographic, respectively radiographic, images is an element sensitive to light rays, respectively to X-rays, in other words an elementary surface, of dimensions for example 0.2×0.2 mm or 0.02×0.02 mm in the specific case of the radiographic sensitive elements, converting the light rays, respectively the X-rays, it receives into electrical signal. Generally, a radiographic sensitive element comprises a scintillator which converts the x-rays into visible light and then a photographic sensitive element, that is to say, a photoelectric sensor or light sensor, which converts the visible light into electrical signal. Techniques of direct conversion of the X-rays into electrical signal also exist. A pixel designates an elementary value of a point of a sampled image, characterized by its gray level between 0 and a maximum value. For example for a 12-bit digital image, a pixel assumes digital values between 0 and 4,095.

A system for reading or acquiring photographic respectively radiographic images includes one or several surfaces sensitive to light rays, respectively to X-rays, that is to say surfaces comprising one or several sensitive elements converting the light rays, respectively the X-rays, into electrical signal to be transmitted to an analysis system conventionally implemented by a computer and designated by a computer system 600 in the remainder of the description. The signals derived from a set of sensitive elements belonging to the same sensitive surface area, acquired by the acquisition device and transmitted together to the computer system, constitute a photographic, respectively radiographic, image. In order to be analyzed by the computer system, the photographic, respectively radiographic, images are preferably converted into digital photographic, respectively radiographic, images either as close as possible to the sensitive surface, for example in an electronic circuit integrated into a physical sensor component including the sensitive area, or remotely, for example as close as possible to the computer system 600, or by the computer system 600.

In the following, the photographic field covers the electromagnetic light waves, later called light rays, in the ultraviolet, visible and infrared ranges, with a wavelength between 10 nm and 5 mm, preferably between 100 nanometers and 20 microns. Preferably, the visible photographic field will be utilized, with wavelengths between 380 and 800 nanometers. The radiographic or X-ray field corresponds to the high-frequency electromagnetic waves whose wavelength is approximately between 0.001 nanometers to less than 10 nanometers.

The computer system 600, an example of which is symbolically illustrated in FIG. 16, can be made in the form of at least one standard computer, therefore including at least one microprocessor, one or several electronic memory units and one or several display (screen, projector, holographic display, etc.), input (keyboard, mouse, touch pad, touch screen, etc.), and/or communication (USB, Ethernet®, Wi-Fi®, Bluetooth®, Zigbee®, etc.) interface(s). The computer system can comprise a computer network sharing data with one or several other computers of the network, or with other networks, for example by an Internet or Ethernet® protocol. In addition to its obvious connection to the image sensors, the computer system can be connected to sensors giving information on the state of the installation, and/or to actuators of the installation (conveyors, ejectors, etc.). The computer system can advantageously be connected to the X-ray tube(s) in order to acquire operating data therefrom and/or to ensure the inspection thereof. The computer system implements one or more software stored and/or executed locally or remotely, including on one or several remote computer servers. This software preferably comprises one or more software programmed to implement the method according to the invention.

The X-ray beams derived from a focal point Fj pass through at least one inspected region, and form, on a radiographic sensitive surface, the radiographic projection of the inspected region, which is sometimes called radiant image and which contains the information on the attenuation of the X-rays by the traversed material.

Radiographic image sensor Ci refers to an X-ray sensitive surface area which receives the radiographic projection of the inspected region. A radiographic image sensor Ci is exposed to the X-rays derived from an associated focal point Fj. The radiographic image sensor converts this radiographic projection into a radiographic image of the inspected region.

When the sensitive surface area contains a line of sensitive elements, the transmitted radiographic image is linear, composed of a line of pixels forming a one-dimensional value table. When the sensitive surface area contains a matrix of sensitive elements, the transmitted radiographic image is a matrix image, composed of a matrix of pixels forming a two-dimensional value table. When the sensitive surface area contains a single sensitive element, the transmitted radiographic image is a point image, composed of one pixel having a value.

Light sensor refers to a surface area sensitive to light rays which converts these rays into a photographic image. When the sensitive surface area contains a line of sensitive elements, the photographic image is linear, composed of a line of pixels forming a one-dimensional value table. When the sensitive surface area contains a matrix of sensitive elements, the photographic image is a matrix image, composed of a matrix of pixels forming a two-dimensional value table. When the sensitive surface area contains a single sensitive element, the photographic image is a point image, composed of a pixel having a value.

A photographic, respectively radiographic, camera includes a light sensor, respectively a sensor of radiographic images, whose image signal is acquired successively to give successive photographic, respectively radiographic, images.

The direction of radiographic projection Dji is the oriented direction or the vector starting from the focal point Fj to pass through the center of the radiographic image sensor Ci, that is to say through the center of an area sensitive to X-rays which receives the radiographic projection of the region inspected at the time of acquisition during the displacement of the container between the focal point and the radiographic image sensor. For an associated radiographic image sensor-focal point pair, the direction of radiographic projection is the vector derived from the focal point reaching the middle of the image sensor. The positioning of the radiographic image sensors is such that the sensitive surface is not parallel to the direction of radiographic projection. It may be advantageous in some cases that the sensitive surface of the radiographic image sensor is orthogonal to the direction of radiographic projection defined with the associated focal point. But this is not mandatory, for example if a sensitive surface contains several radiographic sensitive areas which cooperate for each image capture, with several different focal points, therefore along different directions of projection.

The radiographic directions of projection Dji are different if the directions of projection Dji taken in pairs form together a minimum angle α t least equal to 5'.

A sensitive surface area containing a single line of sensitive elements constitutes a linear image sensor, which includes a linear array of sensitive elements distributed along a support straight-line segment. According to this definition, a column or a line belonging to a sensitive matrix surface, acquired and transmitted separately by the acquisition device is considered to be a linear image sensor. Several sensitive surface areas of the same surface and each containing a single line of different pixels therefore constitute several linear image sensors. In the case of a radiographic image sensor, the direction of radiographic projection associated with the linear radiographic image obtained is therefore the direction starting from the focal point and passing through the middle of the support straight-line segment at the time of acquisition of the image.

A sensitive surface area that contains a matrix of sensitive elements constitutes a matrix image sensor, which includes a matrix array of sensitive elements distributed in a matrix. As illustrated in FIG. 12, according to this definition, a sensitive matrix surface area C11, C12, which belongs to a larger sensitive surface Ss and which is acquired and transmitted separately by the acquisition device, is a matrix image sensor. Several sensitive matrix surface areas C11, C12 of the same surface, acquired and transmitted separately by the acquisition device therefore constitute several matrix image sensors providing different radiographic images respectively M11, M12 (FIG. 13). In the case of a radiographic image, the direction D11, D12 of projection associated with the matrix radiographic image respectively M11, M12 is the direction starting from the focal point F1 and passing through the middle of the sensitive matrix surface area C11, C12, at the time of acquisition of the image. It is therefore possible that the image sensors C11, C12 are non-disjoint regions activated successively in time.

Of course, in the case of a radiographic image sensor, those skilled in the art can use a technology of matrix sensor based on a brightness amplifier or a "screen capture camera" in which a scintillator plate receives the radiant image, converts it into visible light, the image visible at the rear of the scintillator being photographed by a sensitive camera in the emission range of the scintillator, generally the visible range, and provided if necessary with an objective lens.

As seen from the Figures, the object of the invention is an inspection line 100 of empty glass containers belonging to one series.

In general, a container 2 has a central axis A2, which can be an axis of symmetry, or an axis of symmetry of revolution. Thus, as illustrated in FIG. 3, a container 2 has a glass wall 7 delimited internally by an inner surface 8 and externally by an outer surface 9. The wall 7 has between the inner surface 8 and the outer surface 9 a thickness "e". Conventionally, a container 2 is a hollow object whose wall 7 forms, from bottom to top along the central axis A2, a base 3 connected to a heel 3' from which rises a body 4 extending by a shoulder 4' connected to a neck or collar 5 ending with a finish 6 delimiting the mouth that allows filling or emptying the container. In the case of bottles and some flasks, as opposed to jars, the neck 5 corresponds to a portion of narrowed diameter of the container relative to the body 4. The shoulder 4' is a connection portion between the body 4 and the neck 5. For some jars and some other flasks, the shoulder 4' directly connects the body 4 to the finish 6. The upper part of the neck 5 is formed by the finish which comprises the finish surface 6', which is a face, perpendicular to the central axis A2 of the container, transverse to the upper end of the finish 6. The finish 6 generally comprises a neck label 6" which protrudes radially outwardly relative to the neck 5. The lower end of such a neck label 6" forms a transverse annular surface facing axially downwardly, called counter-finish, and which delimits the lower end of the finish 6. In the present text, the neck 5 includes the finish 6, therefore also the finish surface 6' and the neck label 6" and its counter-finish. The neck 5 has an inner diameter D defined by the inner surface 8 of the wall. In the present text, the concepts of top and bottom are arbitrary and correspond to the usual orientation of a jar or bottle-type container which rests by its base 3 on a horizontal surface. The finish surface 6' defines an upper plane Psup of the container 2, perpendicular to the central axis A2. The base 3 of the container 2 defines a lower plane Pinf of the container, perpendicular to the central axis A2. In the following, it is considered that the inspection of the base also includes the inspection of the heel, or of the bottom of the body of the container. It is also noted that, often, checks located in the base 3 are slits that go up to the heel 3', and vice versa.

The inspection line 100 comprises at least three installations 200, 300, 400 which are each arranged at stations distinct from each other along a trajectory of circulation of the containers.

As can be seen in FIG. 16, the inspection line 100 thus comprises, at least:
  a) at a finish inspection station, a finish inspection installation 200 capable of detecting without contact, by light rays, check-type defects in the neck of the containers;
  b) at a base inspection station, a base inspection installation 300 capable of detecting without contact, by light rays, check-type defects in the base of the containers; and
  c) at a radiographic measuring station, a radiographic installation 400 for automatically measuring linear dimensions of at least one region to be inspected of containers.

Of course, the inspection line 100 can include other stations and other installations for inspecting or measuring the containers. Likewise, either of the installations can, in addition to the inspection of checks or to the measurement of linear dimensions, ensure other inspections or other measurements. In particular, it has been seen above that the base inspection installation 300 will be also preferably capable of detecting without contact, by light rays, check-type defects in the heel 3' of the containers, or more preferably in part at least of the body 4 of the containers, for example a lower part of the body 4 of the containers.

The inspection line 100 also includes a device 11 for transporting the containers 2 along the trajectory of displacement of the containers, with a direction materialized by a displacement vector T. Between and in said installations, the trajectory is preferably contained in a conveying plane Pc, here considered to be horizontal and perpendicular to the central axis A2 of the containers.

The three finish inspection, base inspection and radiographic measuring stations, and therefore the corresponding installations are arranged successively one after the other on the trajectory of the containers in the inspection line, therefore along the transport device 11, either in the order cited, as illustrated for example in FIG. 16, or in any other order.

In each of the three finish inspection, base inspection and radiographic measuring stations, and therefore in the corresponding finish inspection 100, base inspection 200 and radiographic measuring 400 installations, the trajectory of displacement is rectilinear and contained in a conveying plane.

Preferably, the trajectory is contained, between said installations and in said installations, therefore along the entire inspection line 100, in a same horizontal conveying plane Pc perpendicular to the central axis A2 of the containers.

Preferably, the trajectory determined by the transport device 11 is also rectilinear between said installations and in said installations, therefore rectilinear along the entire inspection line 100. However, the invention does not exclude the presence of a change of trajectory or direction of trajectory between two stations, therefore between two installations. Likewise, the invention does not exclude the presence of a device of the storage table type between two stations, therefore between two installations, where containers can be accumulated.

In each of the three finish inspection, base inspection and radiographic measuring stations, and therefore in the corresponding installations, the containers are not subjected to a controlled rotation around their central axis A2. By this is meant that it is possible that a rotation of the containers around their central axis A2 may occur, but in an uncontrolled manner, for example because of a contact with stationary guides of the transport device 11. Preferably, in each of the three finish inspection, base inspection and radiographic measuring stations, and therefore in the corresponding installations, and especially in the inspection areas of these installations, the containers are stationary in rotation around their central axis A2, while moving along the trajectory of displacement. Preferably, in each of the three finish inspection, base inspection and radiographic measuring stations, and therefore in the corresponding installations, and especially in the inspection areas of these installations, the containers do not undergo, in operation, the stopping of their displacement along the trajectory of displacement. However, it is generally useful, even necessary, to control the spacing between the items, in other words the free interval between two successive containers 2 traveling in the inspection line 100. To do so, if the spacing of the upstream containers of the inspection line 100 is insufficient, it is possible to use a spacer device installed on the trajectory of displacement of the items. Such a spacer device, which is known furthermore and not described here, operates by creating an acceleration of the downstream items relative to the upstream. Preferably according to one variant of the invention, the spacing of the items is created as far upstream as possible in the inspection line 100. When a spacer device is necessary, it is preferably installed as far upstream as possible from the inspection line 100, and in particular upstream of the installations 200, 500, 300 and 400. Thus, once spaced upstream of the inspection line 100, or upstream in the inspection line 100, the containers do not undergo, in operation, acceleration or deceleration of their displacement along the trajectory of displacement. The displacement of the containers is then stable and avoids the incidents, collisions, falls and accumulations, which ensures a stable production rate with an optimal throughput. However, if one of the installations 200, 500, 300, 400 required additional spacing, it is possible to install a spacer device upstream of this installation, therefore between two installations 200, 500, 300 or 400.

The transport device 11 is formed, at each of the stations, by an associated section 112, 113, 114 of the transport device which ensures the transport of each container through the station while being in contact with the container.

As will be seen more accurately below, one among the conveying sections associated respectively with the finish inspection, base inspection and radiographic measuring stations, ensures contact with a first contact region of the containers, while another among the conveying sections associated respectively with the finish inspection, base inspection and radiographic measuring stations, ensures a contact with a second contact region of the containers which is distinct from the first contact region.

In the example of FIG. 16, it is thus noted that at least one of the conveying sections, in this case the two conveying sections 112, 114 associated respectively with the finish inspection 200 and radiographic measuring 400 stations, ensures a contact with a first contact region of the containers. Such a section is here in the form of a band conveyor 112, 114 in contact with the base 3 of containers 2 while the conveying section 113 associated with the base inspection station 300 is made in the form of a conveyor with side belts which ensures a contact with the body 4 of the containers 2.

It is noted that, in this embodiment, two of the conveying sections associated respectively with different stations, here the finish inspection 200 and radiographic measuring 400 stations, ensure a contact with the same contact region of the containers, here the base 3 of the containers. However, it would be possible to have inspection line configurations in which the three conveying sections associated respectively with the finish inspection 200, base inspection 300 and radiographic measuring 400 stations would ensure a contact with three different contact regions of the containers 2.

In the example of FIG. 18, the conveying section 112 associated with the finish inspection station 200 is in the form of a band or chain conveyor, in contact with the base 3 of containers 2, while the conveying section 113 associated with the base inspection station 300 is made in the form of a conveyor which ensures a contact with the neck of the containers, for example with the part of the finish 6 of the container which is called counter-finish. According to other variants, either of the conveying sections could ensure a contact with the neck, or with the finish.

FIG. 16 illustrates an inspection line 100 which includes, at a shoulder and/or body inspection station, distinct from the finish inspection, base inspection and radiographic measuring stations, a shoulder and/or body inspection installation 500 capable of detecting without contact, by light rays, check-type defects in the shoulder and/or body of the containers. In this example, the shoulder and/or body inspection 500 station is arranged between finish inspection 200 and base inspection 300 stations, but other arrangements are possible. In this example, the shoulder and/or body inspection station is associated with a conveying section which is in fact the continuity of a conveying section associated with an adjacent station, here the immediately preceding station, namely in the example a conveyor band on which the containers rest by their base 3. However, the shoulder and/or body inspection station could have an associated conveying section different from the two conveying sections associated with the two adjacent stations, even different from all the other conveying sections associated with the other stations of the inspection line 100.

In an inspection line 100 according to the invention, the finish inspection 200, base inspection 300 installations and the possible body and/or shoulder inspection 500 installation have common points which will be described together, by highlighting possible differentiating aspects between them. These three installations are installations which are capable of detecting without contact, by light rays, check-type defects in corresponding regions to be inspected of the containers, namely respectively the finish 6, the base 3, and the body 4 and/or the shoulder 4' of the container. The light rays implemented for the detection are in the photographic field, preferably with a wavelength of between 100 nanometers and 20 microns, more preferably in the visible photographic range with wavelengths of between 380 and 800 nanometers.

Checks are defects that take the form of cracks within the thickness of the wall of the container. A check can be a through crack throughout the thickness of the wall, then going from the inner surface 8 to the outer surface 9 of the wall. However, it is generally a non-through crack which generally opens into at least one of the two inner 8 or outer 9 surfaces. Since a check is a crack, it can be considered as being delimited by two surface elements of the material of the wall of the container. These two surface elements are facing each other and can generally be considered as being parallel to each other, separated by a thin, even infinitesimal, layer of air. These surface elements, which are generally non-planar, therefore warped, can have very varied configurations and orientations relative to the container wall area in which the check has formed. To define the orientation of a check, an approximation can first be made by considering that these surface elements can be approximated by an approximation plane or by a series of approximation planes.

In the field of glass containers, those skilled in the art are used to distinguishing between checks called vertical checks and checks called horizontal checks, based on their orientation relative to the central axis A2 of the container 2 which is considered to be vertical. The checks called vertical checks therefore have surface elements with a vertical approximation plane or with an inclination relative to the vertical which is less than 45 angle degrees, preferably less than 30 angle degrees. The inclination of a plane relative to the vertical is defined as the acute angle between a normal to this plane and a horizontal plane. It is noted that a vertical plane can be a radial plane containing the central axis of the container or a plane forming an angle with such a radial plane. The checks called horizontal checks therefore have surface elements with a horizontal approximation plane or with an inclination relative to the horizontal which is less than 45 angle degrees, preferably less than 30 angle degrees. The inclination of a plane relative to the horizontal is defined as the acute angle between a normal to this plane and the vertical direction.

The well-known principle of detection of the check-type defects which is implemented by the installations 200, 300 and 500 is based on the detection of the specular reflection of an incident beam.

At least for the detection of vertical checks, directional light emitters each emitting a directional light beam are generally used. A directional incident beam is a beam of light rays having a beam axis and whose rays are contained in a solid lighting angle α round that beam axis, the solid angle being small. The solid angle of the beam is the solid angle of a cone of circular section which contains all the light rays of the beam. For the sake of simplification, it was agreed to define not the solid angle in steradian, but the divergence angle of the incident beam, in a divergence measurement plane which is a section plane of the solid angle containing the axis of the solid angle. Generally, an incident beam is used having, in the inspection area, a divergence angle which is less than 30 angle degrees, preferably less than 25 angle degrees, even more preferably less than 20 angle degrees. A directional incident beam can be a laser beam or another beam with parallel rays defined by a beam axis and a beam diameter. A narrow incident beam can be a beam of divergent rays, or a beam of convergent rays in the inspection area.

In this manner, a surface element of the container which is lighted by a directional light emitter receives therefrom a beam comprising light rays at close incident angles, in other words incident angles whose difference is less than 30 degrees, even 25 degrees, even 20 degrees: it is in this sense that they are said to be directional. Several directional light emitters which would illuminate the same portion of the outer surface of the container allow obtaining incident angles which are different and possibly distinct from those derived from another directional light emitter, the incident angles being adapted to the highlighting of checks having variable orientations relative to the outer surface of the container.

The region of the container which is located in the inspection area and which is thus lighted, by a given directional light emitter, can be comprised in a circle having a diameter from 5 millimeters to 14 millimeters. The lighted region may be rectangular, for example with a horizontal width of up to 100 or 120 millimeters to cover an entire finish, and for example 60 millimeters in height to cover the height of a finish. Of course, the finishes are generally cylinders and the rectangular shape of the beam can only be observed by imagining a lighted plane orthogonal to the axis of the beam, positioned in the vicinity of the finish surface or of the central axis of the container in the inspection area.

The emission surface of the directional light emitters is preferably inscribed in a circle with a diameter of between 4 millimeters and 30 millimeters.

At least one light receiver, but generally several light receivers are provided to collect the specular reflection of an incident beam.

Due to the varied and largely random nature of the orientation of the checks, and due to the use of directional incident beams at least for the vertical checks, it is necessary to provide several directional incident beams and/or several receivers to be able to detect any check in the region to be inspected of the container.

Exemplary embodiments of a finish inspection 200 and a base inspection 300 installation are schematically illustrated in FIGS. 17 and 18. FIGS. 19 and 20 are schematic views of a finish inspection installation 200, respectively in side view relative to the trajectory of displacement of the containers, and along a view in the axis of the trajectory of displacement.

Each of the finish inspection 200, base inspection 300 installations and of the possible body and/or shoulder inspection 500 installation includes an inspection area of the installation in which the region to be inspected of a container to be inspected must be located. The inspection area can be expanded along the direction of the trajectory of displacement. In each installation 200, 300, 500, a reference axis A200, A300, A500 intended to coincide with the central axis A2 of the container A2 for a position of the container under inspection can be defined. For example, it can be arbitrarily defined that this reference axis is arranged in the middle of the inspection area along the trajectory of displacement of the containers. This reference axis A200, A300, A500 of the installation can be used as the position indicator of the corresponding station.

In each inspection area, a reference plane parallel to the conveying plane in the installation can be defined. For the finish inspection installation 200, the reference plane is a top reference plane Prefh intended to coincide with the upper plane Psup of the container 2 under inspection. For the base inspection installation 300, the reference plane is a bottom reference plane Prefb intended to coincide with the lower plane Pinf of the container 2 under inspection. For the shoulder and/or body inspection installation 500, the reference plane can be an intermediate reference plane, perpendicular to the reference axis A500 of the installation and intended to cut the shoulder 4' and/or the body 4 of the container 2 under inspection.

The inspection areas of the finish inspection 200, base inspection 300 installations and of the possible body and/or shoulder inspection 500 installation are preferably disjoint along the trajectory of displacement, therefore without overlap or intersection.

Each of the finish inspection 200, base inspection 300 installations and of the possible body and/or shoulder inspection 500 installation includes a series of several directional light emitters 201, 202, ..., 20$n$, 301, 302, ..., 30$n$, which are angularly distributed around the reference axis A200, A300, A500 of the installation and which each deliver, in the direction of the inspection area of the installation, a directional light beam along a beam axis A201, A202, ..., A20$n$, A301, A302, ..., A30$n$, specific thereto such that the inspection area is lighted by the directional light beams at a multitude of distinct azimuth angles, in projection in the reference plane, around the reference axis of the installation, and preferably also at a multitude of distinct elevation angles relative to the reference plane. Each directional light beam therefore determines a lighting field in the inspection area. In some embodiments, the lighting field of a directional beam in the inspection area covers the entire region to be inspected of an object located in that inspection area. In some embodiments, the lighting field of a directional beam in the inspection area covers only part of the region to be inspected of an object located in this inspection area. Preferably, the lighting fields of several light emitters 201, 202, ..., 20$n$, 301, 302, ..., 30$n$ overlap in the inspection area of the installation, therefore on the region to be inspected of the container to be inspected, while having beam axes which have different orientations in azimuth around the reference axis, and possibly also in elevation relative to the reference plane. In this manner, a given point of the inspection area of the installation, therefore a given point of the region to be inspected of an object located in the inspection area, is in a position to be lighted by several light emitters along several beam axis directions, in particular different in azimuth around the reference axis. Preferably, all the points of the region to be inspected of an object located in the inspection area are in the position of being lighted by several light emitters along several beam axis directions.

A light emitter includes a light source and generally an optical conditioning device which ends with a light emission surface through which the light beam is emitted in the direction of the area to be inspected. The light source is for example a light-emitting diode, an incandescent filament, an electric arc source, or an electrofluorescent source (neon, plasma, etc.). A conditioning device can include one or several optical components among optical lenses, optical condensers, mirrors, light guides (in particular optical fibers), irises, masks, etc. By mask is meant an opaque piece carrying a cutout in its center and intended, by obstruction, to give shape to a light beam passing therethrough. Generally, a directional light emitter includes a conditioning device which includes at least one optical lens or at least one optical condenser. A directional light emitter can include a conditioning device including a mask located so as to be projected while being optically conjugated with the surface or a surface portion of the container, so that the lighted area is delimited. A rectangular mask allows the lighted area to be rectangular. The light source and the optical components of the optical conditioning device are optical elements of the light emitter. It can be provided that one or several or all of the light emitters of an installation have their own individual light source. However, it can be provided that several light emitters share a common light source. In this case, they can each have their own conditioning device, ending with an individual light emission surface, even if the conditioning devices of several emitters can include one or several common optical components upstream of their individual light emission surface. Typically, a common source can be associated with a bundle of optical fibers including several optical fibers, among which each optical fiber or each of several groups of optical fibers, belongs to the conditioning device of a distinct light emitter. A directional light emitter generally includes a small-sized light emission surface. The emission surface of the directional light emitters is preferably inscribed in a circle with a diameter of between 4 millimeters and 30 millimeters.

In some embodiments, the inspection installation can include directional light emitters 201, 202, ..., 20$n$, 301, 302, ..., 30$n$ which are distributed such that the inspection area is lighted by the directional light beams at a multitude of distinct elevation angles relative to the reference plane while being on the same side of the reference plane of the installation, that is to say by making sure that directional light beams have their respective beam axis A201, A202, ..., A20$n$, A301, A302, ..., A30$n$ distributed at a multitude of distinct elevation angles relative to the reference plane. The elevation angle of a directional light beam is the acute angle formed by the beam axis with the reference plane. Two beams are considered on the same side of the reference plane if the emission surfaces of the directional light emitters from which they emerge are arranged on the same side of the reference plane.

Likewise, each of the finish inspection 200, base inspection 300 installations and of the possible body and/or shoulder inspection 500 installation includes several light receivers 211, 212, ..., 21$n$, 311, 312, ..., 31$n$ which are angularly distributed around the reference axis of the installation and which each have an axis of view A211, A211, ..., A21$n$, A311, A312, ..., A31$n$ and a field-of-view angle AV211, AV311, ..., around this axis of view. Preferably, the fields of view of several light receivers overlap in the region to be inspected, while having axes of view which have different orientations. Typically, the field of view of a light receiver covers part of the region to be inspected of the object, or the entire region to be inspected of the object, along an axis of view. For example, in order to inspect finishes of a diameter of 100 millimeters, the field of view of a light receiver and of its conditioning device preferably has a horizontal width greater than 100 millimeters in the inspection area, measured in a vertical plane containing the reference axis of the installation and perpendicular to the axis of view. In this manner, a given point of the inspection area of the installation, therefore a given point of the region to be inspected of an object located in the inspection area, is in a position of being observed by several light receivers along several directions of the axis of view. Preferably, all the points of the region to be inspected of an object located in the inspection area are in a position of being observed by several light receivers along several axis-of-view directions.

A light receiver 211, 212, . . . , 211n, 311, 312, . . . , 31n includes a light sensor and generally an associated optical conditioning device which ends with a light input surface through which the collected light rays enter in the light receiver in the direction of the light sensor. The light sensor is for example a photoelectric sensor, which may for example be of the CCD type or of the CMOS type. An optical conditioning device can include one or several optical components among optical lenses, mirrors, light guides (in particular optical fibers), irises, masks, etc. In other words, the sensitive area of the light sensor can be arranged at a distance from the light input surface of the light receiver, and can in addition have a different orientation. The conditioning device forms an image of the region to be inspected of the container, or part of the region to be inspected, on the light sensor, generally a linear or two-dimensional image. It optically conjugates at least an outer surface part of the container with the sensitive surface of the sensor. It also defines the axis of view of the light receiver. The light sensor and the optical components of the optical conditioning device are optical elements of the light receiver 211, 212, . . . , 21n, 311, 312, . . . , 31n. It can be provided that one or several or all of the light receivers 211, 212, . . . , 21n, 311, 312, . . . , 31n of an installation have their own individual light sensor. However, it can be provided that several light receivers share a common light sensor. In this case, the light receivers with a common light sensor can each have their own optical conditioning device, ending with an individual input emission surface, even if the conditioning devices of several emitters can include one or several common optical components downstream of their individual light input surface.

To ensure the detection of the vertical checks in a region to be inspected which is associated with a reference plane of the installation, it is necessary to provide that at least part of the directional light emitters, at least their light emission surface, is arranged on the other side of the reference plane relative to the light receivers, at least their input surface, which are provided to collect, after specular reflection on the check, the light emitted by the directional light emitters. Also, each of the finish inspection 200, base inspection 300 installations and of the possible body and/or shoulder inspection 500 installation includes optical elements on either side of the associated reference plane, these optical elements belonging either to light emitters of the installation or to light receivers 211, 212, . . . , 21n, 311, 312, . . . , 31n of the installation.

To ensure the detection of the horizontal checks in a region to be inspected which is associated with a reference plane in the installation, it is necessary to provide that at least part of the light receivers are arranged on the same side of the reference plane as the emitter(s). It should be noted that, to ensure the detection of the horizontal checks, it is possible to use a lighting which is diffuse and therefore non-directional. A diffuse lighting can be provided by the presence of one or several light emitters. One or several light emitters having a large-sized, non-point light emission surface can be used. To ensure the detection of the horizontal checks, the installation can include a large-sized diffuser behind which one or several light sources are arranged.

To ensure the detection of both the vertical checks and the horizontal checks, an installation must therefore have at least optical elements of light receivers on either side of the reference plane, or at least optical elements of light emitters on either side of the reference plane, or both. For example, such an installation will have light emitters arranged on only one side of the reference plane, but light receivers arranged on both sides of the reference plane, or vice versa.

Also, each of the finish inspection 200, base inspection 300 installations and of the possible body and/or shoulder inspection 500 installation includes optical elements arranged on either side of the associated reference plane, these optical elements belonging either to light emitters of the installation or to light receivers of the installation, or to emitters and to receivers.

In the examples of FIGS. 16 to 21, the finish inspection installation 200 includes optical elements of light emitters 201, 202, . . . , 20n, which are arranged on either side of both sides of the top reference plane Prefh, but light receivers 211, 212, . . . , 21n which are all arranged above the top reference plane.

In the examples of FIGS. 16 to 18, the base inspection installation 300 includes light emitter elements 301, 302, . . . , 30n which are arranged on either side of both sides of the bottom reference plane Prefb, but light receivers 311, 312, . . . , 31n which are all arranged below the bottom reference plane.

On the other hand, it can be clearly seen in FIG. 20 that the installation does not include any light emitter or light receiver element which is arranged in the conveying volume Vt. In the case where the trajectory of the containers through the installation is a flat trajectory in a plane parallel to the reference plane, which is the case illustrated, this necessarily leads to limiting the possibility of having light emitter or light receiver elements in the part which is located on the same side of the reference plane as the conveying volume. This leads in particular to forming an inlet tunnel volume and an outlet tunnel volume of the installation, a volume in which it is not possible to arrange a light emitter or a light receiver element.

The radiographic installation 400 for automatically measuring linear dimensions of at least one region to be inspected of containers, allowing the implementation of a method for performing measurements of dimensions on empty glass containers 2 will now be described in relation to FIGS. 1 to 15.

According to one advantageous characteristic of embodiment, at least one region of the container is chosen to be inspected so as to be able to perform measurements of dimensions in this region of the container, corresponding to a dimensional characteristic of the region to be inspected. Typically, the region to be inspected, for this radiographic measuring installation 400, can comprise at least the neck 5 of the container and the measurement of a dimensional characteristic of this region to be inspected corresponds at least to the inner diameter D of the neck. Likewise, the region to be inspected can comprise at least a portion of the wall of the body 4 between the heel and the shoulder and delimited for example by two planes parallel to the plane on which the container is placed, and the measurement of a dimensional characteristic of this region to be inspected corresponds to the thickness e of the glass wall between the inner 8 and outer 9 surfaces delimiting this wall 7. This radiographic installation 400 is therefore very particularly adapted to measure dimensions in relation to the inner surface of the wall at the neck and/or the body of the container. Thus, the method according to the invention allows measuring at least either an inner diameter of the neck or a thickness of the glass wall or an inner diameter of the neck and a thickness of the glass wall.

Likewise, the region to be inspected can correspond to part of the wall 7 comprising the body, the heel or the base of the container. The region to be inspected can also correspond to the entire container 2. The dimensions measured are glass wall thicknesses at the body, the base, the heel, of the heights, the inner or outer diameters, the widths for example for threads on the neck. These measurements also allow deducing a dimensional characteristic of the region to be inspected, for example the ovalization of the container or a container with a bent collar.

The measuring method implemented will be described for glass containers 2, that is to say for series of hollow manufactured objects composed of a single material, namely glass. It is considered in this case that the attenuation coefficient $\mu$ of the glass is unique, that is to say having the same value at every point of a region to be inspected of the containers and preferably constant over time and identical for the containers of the series. These conditions are met because the composition of the glass is stable in furnaces producing several hundred tons of glass per day. It should be noted that the attenuation coefficient $\mu$ of the glass is strictly speaking a spectral property $\mu(\lambda)$ based on the wavelength $\lambda$ or the energy of the X-rays. This characteristic is not necessarily taken into account in the method according to the invention insofar as it is possible to consider, the X-ray source having an emitted spectral composition specific thereto, that the attenuation $\mu$ is a characteristic of the glass for the spectrum of the chosen source.

Preferably, the topology of the object is known. This amounts to saying that it can be considered that an X-ray passing through the container has passed through a finite number of volumes having known attenuation coefficients, therefore that the path can be broken down into segments, each segment joining two points belonging to boundary surfaces of the container, traveling through a region of constant attenuation, even if the length of these segments is not known a priori. In other words, the geometry of the container can be described by computer a priori (before the measurement) by a representation made up of a set of closed surfaces, which can be called boundary surfaces of the container. The boundary surfaces of a container are the interface surfaces between the material of the container and air.

Those skilled in the art will also know how to carry out the invention by using any method for taking into account the spectral attenuation of the beams. They will also be able to adapt the emitted spectrum, for example by hardening it.

Consequently, the attenuation of air can be considered negligible compared to that of glass. The attenuation of an x-ray beam passing through the container will only depend, on the one hand, on said constant attenuation for the emitted x-ray spectrum, and on the other hand, on the cumulative glass thickness traversed. Alternatively, it is considered that the traversed air thickness is large and uniform for all x-rays, therefore it can be considered as known. The X-ray attenuation due to air can be subtracted from the total measured attenuation. Thus, it can for example be considered that the gray level in each radiographic image, possibly corrected, depends solely and directly on the total cumulative glass thickness traversed. It is then possible to accurately determine boundary surfaces which are the transitions between air and glass.

Thus, the computer system 600 takes into account the attenuation coefficient of the glass of the containers under inspection for this calculation operation. Advantageously, the installation 400 includes a device for making available to the computer system the attenuation coefficient of the glass of the containers, for example known from the analyses of the glass in the furnace. This provisioning device can be made by a mass memory, a man-machine interface or by a wired or wireless computer network.

Conventionally, for this linear dimension measuring installation 400, the associated section of the transport device 11 is for example a web or chain conveyor ensuring a linear translation of the containers in the upright position, that is to say with a contact region of the containers which consists of the base 3 of the containers bearing on the conveyor to be established in the conveying plane Pc.

The radiographic installation 400 for measuring linear dimensions allows the implementation of a method for automatically performing measurements of linear dimensions on containers 2 moving by traveling at high rate.

Indeed, the invention relates to an inspection called "in-line" inspection of a series of containers, after a transformation or manufacturing step, in order to inspect the quality of the containers or of the transformation or manufacturing method.

The inspection line 100 including the installations 200, 300, 400, 500 operates for a traveling rate of a flow of containers 2. Ideally, the inspection line 100, including the installation 400 for measuring linear dimensions is capable of processing the production at the production rate, for example at more than 100 objects per minute, preferably more than 300 objects per minute, and for example at a rate of at least 600 containers per minute.

However, in particular with regard to the radiographic installation 400 for measuring linear dimensions, the calculation duration may exceed the interval between two containers. Likewise, the exposure times of the radiographic and reading image sensors may be too long. In general, if the fastest flow cannot be processed by a single radiographic installation 400, then several radiographic installations 400 can be implemented in parallel, each inspecting part of the production. Thus, it is possible to divide the production flow, for example, into two parallels inspected by two identical or similar radiographic installations 400. Obviously, it is preferable that the number of flows and therefore of radiographic installations 400 remains low.

The radiographic installation 400 brings a considerable improvement thanks to the measurement of the inner surface and of the thickness of the walls, without contact and with the traveling of the containers, the complex operations of rotating the items as implemented in carousels are deleted. This also allows a thickness mapping over the entire periphery and over the entire height of the inspected region. For the inspection of the neck, the radiographic installation 400 allows measurements in the neck, for all containers of the production, while the prior art only performs a binary conformity test per template or a measurement test on a few samples taken. These measurements therefore allow an observation of the drifts of the manufacturing method.

As seen more specifically in FIGS. 1 and 2, for the convenience of this description, it is conventionally assumed that the direction of displacement of the containers 2 is established along a horizontal axis X of a reference frame X, Y, Z including a vertical axis Z perpendicular to the horizontal axis X and a transverse axis Y perpendicular to the vertical axis Z and to the horizontal axis X, and X and Y being in a plane parallel to the conveying plane Pc which is horizontal.

As seen more specifically from FIG. 4, during their translational displacement, the containers 2 generate or pass through a volume called conveying volume Vt. The plane Ps is the secant plane of the conveying volume Vt, orthogonal to the conveying plane Pc and parallel to the direction of displacement T. For example, a median plane separates the volume into two equal sub-volumes. The plane Ps is a vertical plane insofar as the conveying plane is generally horizontal.

The radiographic installation 400 also includes, as illustrated in FIGS. 1 and 2, at least one focal point Fj (with j varying from 1 to k) of an X-ray generating tube 12 creating a divergent X-ray beam directed to pass through the conveying volume Vt and more accurately through at least the region to be inspected of the container 2. It should be noted that, for the present description, the container 2 is made of glass so that the region to be inspected of the container is made in a material whose transmission absorption coefficient is homogeneous for a given X-ray radiation.

The installation 400 also includes at least three radiographic image sensors Ci (with i varying from 1 to N, N greater than or equal to 3) sensitive to X-rays and located so as to be exposed to X-rays derived from an associated focal point Fj and having passed through the conveying volume Vt and more specifically, at least the region to be inspected of the container 2. Of course, the tube 12 and the image sensors Ci are located outside the conveying volume Vt to allow the free displacement of the containers in this volume. Conventionally, the X-ray generating tubes 12 and the image sensors Ci are placed in an X-ray proof enclosure, which preferably encompasses the entire radiographic measuring station. This enclosure is therefore disposed along the trajectory of displacement T in a disjoint manner relative to the finish inspection 200, base inspection 300 installations and to the possible body and/or shoulder inspection installation 500, and in particular in a disjoint manner from the respective inspection area of these installations.

In some embodiments, an image sensor Ci is associated with a single focal point Fj in the sense that, in the implementation of the method, this image sensor Ci is provided so that the images it delivers and which are taken into account in the method are formed only of rays derived from the associated focal point Fj. For example, the installation can be provided so that only rays derived from a given focal point can reach the associated image sensor, for example by the disposition of absorbing masks in a suitable manner. According to another example, which can be combined with the previous one, it can be provided that the acquisition of images by an image sensor is only triggered when only the single associated focal point is activated.

The X-ray beams derived from a focal point Fj associated with a radiographic image sensor Ci, pass through at least the inspected region, and form on said radiographic image sensor Ci, the radiographic projection of the inspected region, along a direction of radiographic projection Dji (FIGS. 1 and 2). The direction of radiographic projection Dji is by convention the oriented direction of the vector starting from the focal point Fj to pass through the center Mi of the image sensor Ci. The focal point(s) Fj and the image sensors Ci are disposed such that each radiographic image sensor receives a radiographic projection of the region to be inspected along at least one direction of radiographic projection of the region to be inspected.

However, in some embodiments, several image sensors can be associated with the same focal point Fj, which is then preferably pulsed and synchronized with the readings of each of the associated sensors Ci to form radiographic images along the directions of projection Dji for different values of i. Alternatively in other embodiments, several focal points Fj can be associated with the same image sensor Ci, said focal points Fj being preferably pulsed independently at different times and synchronized with the readings of the associated sensor Ci to form radiographic images along the directions of projection Dji, for different values of j.

The radiographic installation 400 also includes an acquisition system connected to the radiographic image sensors Ci, so as to acquire for each container 2 during its displacement through the radiographic measuring station, at least three radiographic projections of the region to be inspected having different radiographic directions of projection. It is recalled that the direction of radiographic projection associated with the radiographic image obtained is the direction starting from the focal point and passing through the middle of the area of the sensitive surface of the image sensor, at the time of acquisition of the image. Thus, the at least three radiographic projections have directions of projections which form two by two, an angle therebetween.

The acquisition system is connected to the computer system 600. According to an advantageous characteristic of embodiment, the computer system records, using the image sensors Ci for each container during its displacement, radiographic images derived from a determined number of radiographic projections of the region to be inspected along different radiographic directions of projection. Typically, the number of different radiographic directions of projection Dji is between three and forty, and preferably between four and fifteen. According to one advantageous variant of embodiment, the installation 400 includes between three and forty radiographic image sensors Ci. According to a preferred variant of embodiment, the installation 400 includes between four and fifteen radiographic image sensors Ci.

As will be explained in detail in the remainder of the description, the computer system 600 is programmed to analyze, for each container, the at least three radiographic images derived from the at least three radiographic projections of different directions so as to determine, for each container, a digital geometric model of the region to be inspected containing the three-dimensional coordinates of a set of points belonging to the wall of the container in the inspected region. More specifically, each digital geometric model contains the three-dimensional coordinates of a set of points belonging at least to the inner surface of the wall of the container and preferably, to the inner surface and to the outer surface of the wall of the container. The determination of the three-dimensional coordinates of these points allows performing dimensional measurements of the container for the inspected region, namely at least one inner diameter of the neck or at least one thickness of the glass wall of the body 4 of the container or at least one inner diameter of the neck and a thickness of the glass wall of the container body.

The determination of the three-dimensional coordinates of these points and the achievement of the dimensional measurements can be made in any suitable manner by the known techniques of analysis of three-dimensional geometric data.

In general, the digital geometric model of the region to be inspected contains the three-dimensional coordinates of a set of points, calculated from the at least three radiographic images of the region to be inspected. This set of points belongs to the inner and/or outer surface of the container wall, with at least two three-dimensional points in space located in a plane not orthogonal to a direction of radiographic projection Dji.

Advantageously, the digital geometric model of the region to be inspected containing the three-dimensional coordinates of a set of points consists of:

- at least two three-dimensional points of space each belonging to an inner and/or outer surface of the wall of the container and not located in a plane orthogonal to a direction of radiographic projection Dji, nor located in a plane not parallel to the direction of displacement T;
- and/or at least one surface representation of the inner and outer surfaces of the wall of the container containing points not belonging to a plane orthogonal to a direction of radiographic projection Dji, and not belonging to a plane parallel to the direction of displacement T;
- and/or at least a section of the region to be inspected, along a plane different from a plane orthogonal to a direction of radiographic projection Dji and different from a plane parallel to the direction of displacement T.

The dimensional measurements are then performed according to any of the methods described in the remainder of the description.

In general, the dimensional measurements performed on the digital geometric model of each container relate to at least one inner diameter of the neck measured on said model in a plane not orthogonal to a direction of radiographic projection Dji, and/or to the at least one thickness of the body wall measured on said model in a plane not orthogonal to a direction of radiographic projection Dji.

One preferred exemplary embodiment comprises the determination, for each container, of a digital geometric model representing the inner surface and the outer surface of the container in the region to be inspected.

According to this example, the digital analysis of the radiographic images relating to each container allows constructing a three-dimensional digital geometric model for each of these containers. In other words, for each container inspected by radiography, a three-dimensional digital geometric model can be constructed from the radiographic images corresponding to said container. Optionally, this digital geometric model can simply be a stack of two-dimensional digital geometric models. The production of a digital geometric model is how—in mathematical, graphical and data structure terms—three-dimensional containers are represented and handled in digital form in a memory of the computer system 600. It should be considered that in some of these embodiments, it is possible to determine as many three-dimensional digital geometric models as there are radiographic objects, and that there may be as many radiographic objects as the number of objects traveling on the transport system. Indeed, a characteristic of the invention is that it allows performing a measurement on each of the objects circulating in the installation, including at high rate.

The modeling can be a volume modeling. The glass container can therefore be represented by voxels whose value represents a quantity of material. The voxel can be full, partially full, or empty of material (in this case it is air). The volume geometric model can be analyzed to locate the boundary surfaces of the container, for example by determining a set of representative points belonging to these boundary surfaces, and then to measure linear dimensions such as lengths or thicknesses. It can also be transformed into a surface model, that is to say in which boundary surfaces of the container are modeled.

It is possible, and even advantageous, to obtain a surface model directly from the radiographic images, that is to say without going through the calculation of a volume model.

In the surface modeling, a container is defined by at least one three-dimensional surface, for example a three-dimensional surface corresponding to a boundary surface between the material of the container and the external environment (generally air), which allows understanding the concepts of interior and exterior of the container. Generally, the three-dimensional surfaces are modeled in several manners such as by polygonal modeling, by curves or parametric surfaces (cylinders, cones, spheres, splines, etc.) or by subdivision of surfaces. Using a mesh of polyhedra, for example triangles, the three-dimensional surfaces of the containers are represented by sets of planar facets related by their edges.

A section of a three-dimensional container is its intersection with a plane. The section of the three-dimensional surfaces constitutes two-dimensional curves in the section plane. The knowledge of these two-dimensional curves in a succession of cutting planes allows the reconstruction of the three-dimensional surfaces.

In order to perform measurements of linear dimensions such as lengths, there are several approaches. A linear dimension is indeed a length measured along a line. This line along which the linear dimension is measured can be a rectilinear line, or a non-rectilinear line, for example any curved line, a circular line, a broken line, etc. This line can be a flat line, contained in a plane, or a three-dimensional line which is not comprised in a plane. The radiographic installation 400 also allows determining angles and coordinates of points of the surfaces of the container in a 2D or 3D reference frame.

In a first method, called volume method, it is possible to travel through a volume model along a straight line or a bundle of straight lines and to determine the material/air boundary voxels.

In a second method, called surface method, it is possible to calculate a segment whose ends are the intersections of a straight line with the material/air boundary surface of a surface model. Finally, a mixed method consists in transforming the volume model into a surface model, then in applying the second method.

A third method consists in determining in a cutting plane, the distance between two points of one or two two-dimensional curves, any curve being a boundary between material and air.

A three-dimensional point is a point whose coordinates in the three-dimensional space are known, in any reference frame.

These three previous methods are examples of determination of a distance between two three-dimensional points, to determine a linear dimension measurement.

One objective of the invention is to perform measurements more complete than those made possible by simple two-dimensional radiographic images. Indeed, it is easy, using a matrix radiographic image sensor, to obtain a two-dimensional radiographic image corresponding to a projection of the inspected region and to measure dimensions in a plane orthogonal to the direction of projection called "projected plane". Likewise, it is easy, using a linear radiographic image sensor, to obtain a two-dimensional radiographic image of the inspected region, by juxtaposing the successive linear radiographic images obtained using a sensor of linear radiographic images Ci, while the container passes through the projection plane Pji not parallel to the displacement, defined by a focal point Fj and the linear sensor Ci, and to measure dimensions of the region inspected only in a projected plane, which is parallel to the direction of displacement. However, with these simple radiography methods, it is impossible to measure dimensions outside projected planes. On the other hand, with the radiographic installation 400, linear dimensions can be measured along directions which are neither contained in the projected planes, nor parallel to the projected planes. Indeed, during the processing of a combination of the radiographic images along at least three different directions of projection, dimensions can be reconstructed and measured along virtually all directions. This is possible by any method that allows the determination of three-dimensional points in space belonging to a boundary surface included in the region to be inspected of the container. The reconstruction of a three-dimensional model of the region to be inspected, of the surface or volume type or based on cutting planes, is one possible method. Indeed, it is possible, either indirectly from a surface or volume model or from cutting planes or directly, to determine at least two three-dimensional points, even preferably three-dimensional point clouds, distributed along directions that cannot be measured from the only two-dimensional radiographic images.

The digital geometric model is therefore made up of geometric elements such as points, segments, surfaces, elementary volumes, calculated from radiographic projections by considering, to calculate each element, the attenuation of at least some X-rays having passed through this point on the actual empty container, with the aim that the digital geometric model is a faithful representation of the geometry of the actual empty container, including deformations relative to an ideal empty container. In other words, the coordinates of the geometric elements are determined by considering that said coordinates have modified the radiographic projections, even when these geometric elements are not distinguishable in any of the 2D radiographic projections. The measurements of dimensions on the digital geometric model therefore give information on the dimensions of each modeled empty container, from geometric elements that are not distinguishable in any of the radiographic projections.

In cases where the glass container is made of a single material, therefore with a constant attenuation coefficient or considered as such, it is advantageous to determine its digital geometric model in the form of surfaces. It is possible to determine and represent in the digital geometric model, for example, the inner surface of the neck of the container. The inspected region contains, according to this example, the neck 3 and therefore extends between the finish surface plane 6 and a plane parallel thereto. The inner diameter of the neck D can then be measured. More exactly, several inner diameters of the neck D can be measured. By choosing a given height for example by choosing a cutting plane parallel to the surface of the finish or to the base of the container, several diameters can be measured from 0 to 360° in this plane. Thus, it is possible to determine the diameter at the opening Do (or mouth), for example 3 mm below the mouth, by positioning a cutting plane 3 mm below the finish surface. It is also possible to determine a minimum diameter D over the entire height h of the inner surface of the neck to replace the measurement by broaching.

Given the geometry of the containers, it is easier to reason in cylindrical coordinates. When performing the measurements on a container, the method has produced a digital geometric model MGN accurately representing at least the region to be inspected of said container corresponding to the neck, for example as illustrated in FIG. 14 or as illustrated in FIG. 15, a vertical section or four horizontal sections of the digital geometric model MGN of the container.

It is possible to define a reference frame of cylindrical coordinates ZM, p, 0 on this digital geometric model, with the axis ZM which corresponds to the axis of symmetry of said container model, with the height Z along the axis ZM which is equal to zero when it is located in the placement plane. In the case of a cylindrical or conical container, ZM can be defined as an axis orthogonal to the placement plane and passing through the center of the base of the container. Actually, the digital geometric model MGN of a container comprises inner SI and outer SE surfaces.

According to one advantageous variant for measuring the neck of each container, the method consists in measuring on the digital geometric model MGN, as internal diameters D of the neck, the lengths of a set of straight-line segments, said segments being:

orthogonal to the axis of symmetry ZM of the digital geometric model, secant with the axis of symmetry ZM of the digital geometric model, located at least at two distinct heights ZG1, ZG2 in the neck of the digital geometric model;

of directions distributed angularly around the axis of symmetry ZM of the digital geometric model, with at least one segment not orthogonal to the directions of projection Dji;

for each height, a number greater than the number of directions of projections Dji;

and each segment connecting two points which belong to the inner surface of the neck of the digital geometric model and which are opposite relative to the axis of symmetry ZM of the digital geometric model of the container.

It should be noted that the segments would cross the axis of symmetry ZM exactly in the mathematical sense only in the case of ideal containers of perfect revolution. This is obviously not the case since the digital geometric model represents an actual container.

The radiographic installation 400 allows performing in line, that is to say when the containers are in rapid translation on a conveyor, and without the contact of a mechanical or pneumatic sensor, several measurements which are necessary, depending on the types of production, to guarantee the conformity of the neck.

The broaching is the possibility to introduce into the neck a cylinder of minimum diameter, for example the filling cannula. To measure the broaching, it is possible to determine, thanks to the radiographic installation 400, the minimum diameter over several heights along the axis of symmetry ZM and along several directions at angles θ ranging from 0 to 360°. It is also possible to simulate the introduction of a cylinder, inside the inner surface of the digital geometric model of each container, at its neck, and to determine the maximum diameter that the cylinder reaches when it is inscribed, therefore in contact without being able to get larger, inside the inner surface of the neck or of a set of points of said inner surface.

As illustrated in FIG. 15, it is possible at least for two distinct heights ZE1, ZE2 to measure the thickness e of the wall along several radial segments orthogonal to the axis ZM and distributed from 0 to 360°. At least the same function that the optical sensors allow in a machine rotating the container is thus achieved, namely finding the minimum thickness on the circumference at one, two, three or four distinct heights.

The digital geometric model of the inspected region of each container comprises the inner SI and outer SE surfaces. It is therefore also possible to determine the thickness e by measuring a large number of segments joining the outer surface SE and the inner surface SI, distributed uniformly over the entire height Z and the directions θ, with a height pitch dZ and an angular pitch dθ as fine as allowed by the resolution of the sensors and of the digital geometric model calculated for each container. Thus, it is possible to map the thickness in all or part of the inspection region, even of an entire container.

It is also possible to calculate a minimum thickness over the region to be inspected, or to determine a related area of the wall having a thickness smaller than a tolerance threshold called "thin area" and the quality of the container is decided based on the minimum thickness or on the surface and/or on the shape of the area of the thin area.

According to one variant of embodiment, the region to be inspected in this radiographic installation 400 can comprise at least part of the neck 5 of the container so that the radiographic images are analyzed to construct a digital geometric model of at least the inner surface of the neck so that the inner diameter of the neck D can be measured at one or several heights and along one or several directions, and correspond to the measurement of a dimensional characteristic of the region to be inspected.

According to another variant of embodiment, the region to be inspected in this radiographic installation 400 can comprise at least part of the body 4 of the container so that the radiographic images are analyzed so as to construct a digital geometric model of the inner surface and of the outer surface of the container in the inspected wall part, and from the inner and outer surfaces of the digital geometric model, to obtain the measurement of the thickness "e" of the glass wall of the container body comprised between said surfaces.

According to one preferred variant of embodiment, the region to be inspected comprises at least part of the neck and part of the wall of the container body so that the radiographic images are analyzed so as to construct a digital geometric model of the inner and outer surface of the container, and from the inner and outer surfaces of the digital geometric model, to obtain the measurements of an inner diameter of the neck and of the thickness of the glass wall of the container body.

Some of the preceding measuring methods amount to analyzing the geometry of the digital geometric model of each container based on successive sections, at different heights Z, of planes orthogonal to the axis of symmetry ZM of the digital geometric model of the container, therefore on horizontal sections which are then analyzed along radial directions, by varying the measurement direction with the angle θ between 0 and 360°. The same results are of course obtained by cuts along planes secant to the axis of symmetry ZM of the containers, therefore vertical sections, distributed at angles θ between 0 and 360°.

According to one advantageous variant of embodiment, the digital geometric model can also be constructed by using an a priori geometric model of the inspected region that allows accelerating and making the reconstruction calculations of the digital geometric model of each container more reliable.

Thus, the a priori geometric model is a digital geometric model of the series of containers, serving as an initialization for reconstruction software in order to construct the digital geometric model of each inspected container. Its role is mainly to provide the computer system with information on the shape, geometry and dimensions of the object to be modeled by the calculation.

In this case, the computer system has an a priori geometric model of the region to be inspected in order to perform this calculation operation. Thus, the installation 400 can include a device for making available to the computer system an a priori geometric model of the region to be inspected for the containers or series of containers.

The a priori geometric model can be obtained by the digital model for a computer-aided design of the containers which is produced during their design (3D CAD), or can be obtained from a digital geometric model constructed from the measurement of one or several containers of the same series (therefore of the same commercial model) by a measuring device, for example by a sensor-measuring machine by or an axial tomography apparatus, or can be generated by the computer system from values entered and/or drawings made and/or shapes selected by an operator on the man-machine interface of the system.

It is possible to parameterize the inspection by making virtual gauge positions available to the computer system. In this case, the device according to the invention obviously includes means for making available measurement tolerance intervals.

Another means for determining dimension measurements and their conformity is the comparison of the digital geometric model of the inspected region with a reference or theoretical geometric model.

The reference geometric model is an ideal model of the series of the inspected containers. To carry out a dimensional inspection, it is possible to compare the digital geometric model of the inspected region of each container with the reference geometric model common to the series of containers, by an algorithm comprising the matching of the models, then the measurement of the deviations between the models. The reference geometric model can be derived from the CAD at least for the outer surface of the containers.

According to one variant, the reference geometric model and the a priori geometric model can be the same geometric model.

It is seen from the description above that the computer system 600 determines for each container, at least one inner diameter of the neck and/or a thickness of the glass wall of the container body. In general, the radiographic installation 400 allows performing a series of measurements of dimensions on the containers 2. The dimensional inspection consists in measuring actual dimensions and comparing them with the required dimensions. A priori, any container of a series is close to the ideal reference container with the required dimensions but deviates therefrom by dimensional variations. The objective is generally to compare the measurements obtained on the containers with the required values, for example defined by a quality department. These dimension measurements or the deviations of these measurements relative to the required values can be displayed, recorded, etc. They can also be used to make decisions on the conformity of the containers which can be sorted automatically. According to one advantageous characteristic of embodiment, the computer system 600 is connected to a device for displaying the linear measurement values of the region to be inspected and/or the dimensional deviations relative to reference values. For example, the installation 400, or more generally the inspection line 100 according to the invention, can include a screen for displaying the radiographic images of the inspected region and of the measured dimensions.

Of course, the relative positions of the focal points Fj and of the image sensors Ci are diverse being reminded that the focal points Fj and the image sensors Ci are positioned outside the conveying volume Vt.

According to one variant of embodiment, the radiographic installation 400 includes a single focal point Fj=F1 disposed along one side of the conveying volume Vt and a series of image sensors Ci=C11, C12, C13, . . . disposed along the opposite side of the conveying volume Vt to receive the rays coming from the focal point F1 and having traversed the region to be inspected. In this example, the focal point has an opening Of which is measured in at least any plane, such as for example the plane X, Y in FIG. 1, which is greater than or equal to 90°. This opening Of is considered at the output of the focal point, in the case where the installation comprises, between the focal point and the volume Vt, or between the volume Vt and the image sensors, screens of limitation of the beams to the sole useful beams, in order to reduce the scattered one.

According to another variant of embodiment of the radiographic installation 400, at least two X-ray production focal points Fj (F1 and F2) are positioned separately in two distinct positions and at least three X-ray sensitive image sensors Ci are placed in such a manner that each focal point is associated with at least one image sensor Ci, and that each image sensor Ci is associated with a focal point and receives the X-rays derived from said focal point and passing through the region to be inspected. In this variant, each focal point has an opening greater than or equal to 45° so that the sum of the openings of the two focal points is greater than or equal to 90°. It is thus possible to envisage for example a radiographic installation 400 including for example an opening focal point Of greater than or equal to 120°, or a radiographic installation 400 including two focal points, the sum of the openings of which is greater than or equal to 120°.

In the exemplary embodiment illustrated in FIGS. 5 to 7, the radiographic installation 400 includes three focal points F1, F2, F3 each associated with a distinct generator tube 12. The radiographic installation 400 also includes five image sensors C11, C12, C13, C14 and C15 each sensitive to X-rays derived from the first associated focal point F1, five image sensors C21, C22, C23, C24 and C25 each sensitive to X-rays derived from the second associated focal point F2 and three image sensors C31, C32, C33 each sensitive to X-rays derived from the third associated focal point F3.

According to this exemplary embodiment, the radiographic installation 400 includes at least one focal point (and in the example, two focal points F1 and F2) from each of which a divergent X-ray beam is derived. At least one focal point (and in the example, two focal points F1 and F2) are positioned on one side of the secant plane Ps so that each of the beams passes through the secant plane Ps and the region to be inspected, while at least one image sensor Ci associated with said focal point Fj to receive the X-rays derived from said focal point 9 is disposed on the opposite side relative to the secant plane Ps. (in the example, these are the five image sensors C11, C12, C13, C14 and C15 each sensitive to X-rays derived from the associated focal point F1 and the five image sensors C21, C22, C23, C24 and C25 each sensitive to X-rays derived from the associated focal point F2). Of course, it can be provided to have a focal point on one side of the secant plane Ps and another focal point on the other side of the secant plane Ps so that the associated image sensors are also disposed on either side of the secant plane Ps.

According to one advantageous variant of embodiment of the radiographic installation 1 which is illustrated in FIGS. 5 to 7, a focal point Fj from which a divergent X-ray beam is derived is disposed on one side of the conveying plane Pc so that its beam passes through the conveying plane Pc, while at least one image sensor Ci associated with said focal point Fj to receive the X-rays derived from said focal point is positioned on the opposite side relative to the conveying plane Pc. In the example illustrated, a focal point F3 is disposed above the conveying plane Pc while three image sensors C31, C32, C33 are positioned below the conveying plane Pc. Of course, the position between the focal point and the image sensors can be inverted relative to the conveying plane.

According to one advantageous variant of embodiment of the radiographic installation 400, at least one of the focal points Fj is disposed in the conveying plane Pc. Preferably, these focal points cooperate with associated image sensors located at their opposites relative to the secant plane Ps, and thus in the case of a transport of the containers disposed on a planar conveyor, this disposition allows that in the radiographic images, the projections of the containers are not superimposed on the projection of the conveyor. Thus, in the digital geometric model of the containers, the part of the container in contact with the associated section of the conveyor can be accurately determined.

According to one advantageous characteristic of embodiment, the disposition of the radiographic image sensors Ci and of the focal points is such that the X-rays derived from the focal point(s) Fj and reaching the image sensors Ci only pass through a region to be inspected at a time. In other words, the X-rays pass through only one container at a time. It should be noted that the radiographic installation 400, or the inspection line 100 in general, can include a system for inspecting the spacing between the successive traveling containers, such as for example screws or belts in lateral contact with the containers.

The radiographic system 400 allows obtaining a dimensional inspection not only quick, but also inexpensive, with the accuracy necessary for a dimensional inspection. It allows reducing the number of images necessary for the reconstruction to the minimum number that allows reaching the desired dimensional accuracy. For example, it allows, with nine projections and a limited number of images of the inspected region, measuring the inner diameter of a neck at +/0.05 millimeter, or the thickness of a container wall at +/−0.02 millimeter. Advantageously, the radiographic installation 400 includes between one and four focal points Fj, and preferably one or two focal points Fj, and preferably between four and fifteen radiographic image sensors Ci.

The radiographic image sensors and the focal point(s) should be disposed so that the combination of the at least three directions of projections optimizes the determination of the digital geometric model of the inspected region, considering that the traversed volume Vt should be left free for the circulation of the containers. The rules below are advantageously implemented, these rules being valid for linear or matrix image sensors.

In the following, an angle is an absolute value. FIGS. 8 and 9 illustrate two radiographic directions of projection Dji and D'ji which are also vectors. These Figures show the angle r between these two radiographic directions of projection, namely r=(D̄j̄,D̄'lj) and s the angle complementary to the angle r, namely s=180°−r. By definition, the effective angle α between two different directions of projection Dji and D'ji, is the smallest of the angles r and s, namely α=Min(r, s). Thus, the effective angle α is the smallest of the angles formed by the two straight lines carrying the directions of projection Dji, D'ji and brought to every point of the inspected region.

According to one advantageous variant, at least two images derived from two radiographic projections along two different radiographic directions Dji and D'ji forming therebetween an effective angle α greater than or equal to 45° and less than or equal to 90° are acquired for each container.

According to one advantageous variant of embodiment, at least two images derived from two radiographic projections along two different directions forming therebetween an effective angle α greater than or equal to 60° and less than or equal to 90° are acquired for each container.

To do so, the radiographic installation 400 includes at least one focal point and two image sensors disposed such that the directions of projection of the inspected region they receive have therebetween an effective angle α greater than or equal to 45° and less than or equal to 90° and, advantageously greater than or equal to 60° and less than or equal to 90°.

For example as illustrated in FIG. 5, the effective angle α between the directions 015 and D11, and between the directions D13 and D25 are greater than 45°. Obviously, it must be understood that at least one effective angle is greater than or equal to 45° and less than or equal to 90° and advantageously that at least one effective angle is greater than or equal to 60° and less than or equal to 90° and the other effective angles between two directions Dji are arbitrary. Those skilled in the art using this rule will know how to look for a disposition which offers the most complete possible distribution of the directions of projections of the inspected region.

According to another advantageous characteristic, for each container, the computer system 600 acquires at least one radiographic image of the inspected region corresponding to a direction of projection forming an opening angle β determined with the direction of displacement T.

As illustrated in FIGS. 10 and 11, the angle p is considered between a direction of projection (vector Dji) and the trajectory of the containers (vector T), namely the angle p=(Dji, T) i.e. p=(D11, T) and p=(D12, T) in the example illustrated in FIG. 10 and p=(D22, T) and p=(D11, T) in the example illustrated in FIG. 11. The angle q complementary to the angle p is such that q=180°–p. By definition, the opening angle β between a direction of projection Dji and the trajectory T is the smallest of the angles p and q, namely β=Min (p, q). Thus, the opening angle β is the smallest of the angles formed by the two straight lines, one carrying the direction of projection Dji and the other carrying the trajectory T, brought to every point of the inspected region.

According to another advantageous characteristic, for each container, the computer system acquires at least one radiographic image of the inspected region corresponding to a direction of projection Dji having with the direction of displacement T, an opening angle β between 10° and 60°. In other words, the installation according to the invention includes at least one focal point and one image sensor Ci disposed such that, when a container passes through the field of the image sensors, the direction of projection Dji of the region inspected on the image sensor Ci forms an opening angle β with the direction of displacement T between 10° and 60°.

In other words, the configuration of the radiographic installation 400 is optimized to reduce its bulk in the direction of displacement while maintaining a traversed volume Vt adapted to the containers and a good quality of reconstruction.

Due to the traversed volume Vt, the installation does not produce a projection around the direction of displacement T. The traversed volume Vt imposes a minimum angle beta. According to the invention β min=10°. There is no sensor disposed to provide a projection of angle β less than 10°.

It must be deduced from the foregoing that the distribution of the projection angles for each container is not uniform according to the invention.

As illustrated in FIG. 9, the distribution of the projection angles presents a gap, called blind spot region, of twice 10° namely 20°, instead of having full coverage over 180°.

For example as illustrated in FIG. 10, the radiographic installation 400 includes at least one focal point F1 and two image sensors C11, C12 whose directions of projections D11, D12 define with the direction of displacement T, an opening angle β between 10° and 60° corresponding respectively to the angles p and q. In the example illustrated in FIG. 11, the radiographic installation 400 includes at least one image sensor C11, associated with a focal point F1 and an image sensor C22 associated with a focal point F2. The directions of projections D11, D22 define the opening angle β can thus be envisaged for example a radiographic installation 400 including for example an opening focal point Of greater than or equal to 120°, or a radiographic installation 400 including two focal points whose sum of the openings is greater than or equal to 120° between 10° and 60° and corresponding to the angles p. Likewise, the radiographic installation 400 illustrated in FIG. 5 includes an image sensor C11 associated with the focal point F1 and whose direction of projection D11 forms an opening angle β between 10° and 60°, relative to the direction of displacement T.

The radiographic image sensors Ci are of the matrix or linear type.

According to one preferred variant of embodiment, the radiographic installation 400 includes linear image sensors. According to this preferred variant, each radiographic image sensor Ci includes a linear array of X-ray sensitive radiographic elements distributed along a support straight line Li defining with the associated focal point Fj, a projection plane Pji containing the direction of radiographic projection Dji (FIG. 2). These radiographic image sensors Ci are disposed such that at least m radiographic sensitive elements of each of these radiographic image sensors receive the radiographic projection of the region to be inspected by the X-ray beam derived from the associated focal point Fj, with the projection planes Pji for the different image sensors which are distinct from each other and not parallel to the conveying plane Pc. The number m of sensitive elements of each linear radiographic image sensor is greater than 128, preferably greater than 512. The distance between neighboring radiographic sensitive elements (called pitch) and/or the dimension of the radiographic sensitive elements is preferably less than 800 µm. The frequency of reading the image lines is preferably greater than 100 Hz, advantageously greater than 1 kHz. Of course, these parameters are adapted based on the size of the containers, the desired accuracy and the traveling speed.

According to one advantageous characteristic of embodiment, the support straight lines Li of at least three linear radiographic image sensors Ci are parallel to each other.

According to another advantageous characteristic of embodiment, the support straight lines Li of at least three linear radiographic image sensors Ci are orthogonal to the conveying plane Pc.

According to one variant, a focal point Fj is positioned so that its beam passes through the inspected region and then the conveying plane Pc. In addition, at least one associated linear radiographic image sensor Ci is positioned opposite the focal point Fj relative to the conveying plane Pc and such that its support straight line Li is parallel to the conveying plane Pc.

According to these variants of embodiment with linear radiographic image sensors, the acquisition system acquires using each of the at least three radiographic image sensors Ci, at each incremental displacement of each container on the trajectory, linear radiographic images of the region to be inspected based on a number chosen so that for each container, the whole region to be inspected is fully represented in the set of the linear radiographic images. Thus, during the displacement of a container, each radiographic image sensor is able to acquire linear radiographic images so that the whole region to be inspected of the container is fully represented in the set of the linear radiographic images obtained from said radiographic image sensor. Thus, for each container, at least three sets of linear radiographic images of the region to be inspected are obtained and then analyzed. It is possible to construct matrix radiographic images of the inspected region by juxtaposition of the sets of linear radiographic images. But the reconstruction of the geometric model and the measurement do not necessarily impose it.

It should be noted that given the traversed volume Vt, no radiographic projection is acquired in the blind spot region ($\beta \leqq 10°$) located on either side of the direction of displacement T. The radiographic installation 400 allows, despite the absence of radiographic projections in this range of angles, reconstructing, thanks to the a priori geometric model, an accurate and complete digital geometric model of the container. It is thus possible to perform linear dimension measurements on the entire digital geometric model and particularly along directions not orthogonal to the possible directions of projection, including linear dimension measurements along directions of measurement orthogonal to the directions of missing projections corresponding to the blind spot region located on either side of the direction of displacement T.

The incremental displacement is the translation performed by the container between two successive acquisitions of images. For a given traveling speed of the containers, the incremental displacement is limited inferiorly by the speed of reading the image sensors. This parameter, combined with the vertical resolution of the linear image sensors (or with the horizontal and vertical resolutions of the matrix image sensors), conditions the density of measured points of the digital geometric model, and therefore ultimately the spatial resolution and the accuracy of the measurement of the dimensional characteristic of the region to be inspected. For example, the incremental displacement may be less than 0.5 mm, preferably less than 0.2 mm, which means that the image sensors are read 5 times during a displacement of 1 mm of the containers.

Of course, the number of focal points, the number of radiographic image sensors associated with each focal point, and their relative dispositions are chosen in any suitable manner based on the desired degree of measurement accuracy, on the shape of the containers and on their spacing on the conveyor.

The radiographic installation 400 allows the measurement of dimensions (for a dimensional inspection) on glass containers traveling at high rate and without contact, by at least three X-ray projections of different directions, and for an optimal, quick and sufficiently accurate calculation.

It should be noted that in glassworks, it is possible that several series of different containers are present at the same time on the same inspection line. The radiographic installation 400, and more generally the inspection line 100, according to the invention can be used to inspect a flow of containers composed of several different series, for example a first series and a second series. In this case, the radiographic installation 400, or more generally the inspection line 100, includes an indication system for indicating to the computer system 600 the series to which each of the containers belongs in order to implement the method of the invention to all the containers of the same series. In other words, it is provided to make available to the computer system an a priori geometric model of each series of containers, and the computer system is adapted in order to associate the radiographic images of each container with the series to which it belongs.

It is noted that, in each station, the area of contact of the containers with the section of the transport device which is associated with this station is preferably distinct from the area to be inspected of the containers at this station, especially for the finish inspection, base inspection and shoulder or body inspection stations that implement an optical inspection by light rays.

In addition, in an inspection line as described above, it is possible to provide that the containers are conveyed without vertical displacement, neither in the three finish inspection, base inspection and radiographic measuring stations, nor between the finish inspection, base inspection and radiographic measuring stations. This simplifies the design of the line, reduces its cost, allows high rates and simplifies the format change operations.

Particularly, in an inspection line implementing the installations as described above, it is possible to provide that the containers are conveyed without controlled rotation around their central axis in the three finish inspection, base inspection and radiographic measuring stations, this while allowing an inspection for checks and the measurement of linear dimensions over the 360 degrees of the container around its central axis A2. In addition, and preferably, in an inspection line implementing the installations as described above, it is possible to provide that the containers are conveyed without controlled rotation between the finish inspection, base inspection and radiographic measuring stations.

It has already been proposed, for example, in documents EP2368861 or WO2008101492, that each container of the series of containers carries a unique identifier. This unique identifier, for each container, is connected to, or contains, at least production data of the container, and/or a time stamp and/or the number of the mold in which the container was formed and/or the number of the section or of the cavity in which the container has been formed. In this case, it can be provided that the inspection line includes at least one reader of the unique identifier of the containers inspected by the inspection line. It is possible to provide a computer system 600 which receives:
  from the finish inspection installation, at least one finish inspection information for the inspected container;
  from the base inspection installation, at least one base inspection information for the inspected container;
  from the radiographic measuring installation, at least one linear dimension measurement for the inspected container.

In this case, the computer system can be configured to create a computer report linking, for all the inspected containers in the series, the unique identifier of a container, the at least one finish inspection information, the at least one base inspection information and the at least one measurement for this inspected container, and to store this computer report in an electronic memory such that the report then remains accessible preferably throughout the life of the container, including for example at least until its acquisition by an end customer, therefore generally for several weeks, preferably several months, or even several years.

Of course, if the inspection line comprises a shoulder and/or body inspection installation, it will be advantageously provided that a shoulder and/or body inspection information for the inspected container is also be received by the computer system and is also related to other information in the computer report.

For example, the computer report can be part of a database in which these data are linked together as relating to the same element, in this case the container which can be identified by its unique identifier. The computer report for a container can include other data, in particular production data that allow identifying, for example, the place, date, hour, minute, second of molding, and/or the production machine, the mold, the cavity, etc. Later, other data, for example filling, distribution, marketing, use or recycling data, can be aggregated in the computer report. The computer report can be integrated into a blockchain that allow ensuring an unforgeable traceability.

Furthermore, the computer system 600 can advantageously be configured to perform a computer processing on the computer reports of a group of containers of the series. This processing can be a statistical processing. The computer system can also be configured to order a corrective action on a production parameter of the containers, based on this computer processing on the computer reports of a group of containers of the series.

According to one advantageous characteristic of embodiment, the computer system can be connected to a device for sorting the containers based on the linear measurement of the region to be inspected and/or based on one or several inspection information. Thus, this sorting device can eject from the transport device, the containers considered to be defective in consideration of the measured linear dimensions.

The invention is not limited to the examples described and represented because various modifications can be made without departing from its scope.

The invention claimed is:

1. A line for inspecting empty glass containers of a series (2), each container of the series having a wall which is delimited by an inner surface (SI) and an outer surface (SE), which has a central axis (A2), and which forms, from top to bottom along the central axis:
   a neck (5) ending with a finish (6), an upper face of which defines an upper plane (Psup) of the container, perpendicular to the central axis,
   a shoulder (4'),
   a body (4),
   and a container base (3) which defines a lower plane (Pinf) of the container, perpendicular to the central axis;
the inspection line (100) including a transport device (11, 112, 113, 114) which ensures, by contact with at least one contact region of the containers, the transport of the containers along a trajectory of displacement (T), the containers traveling through a conveying volume (Vt) extended along the trajectory of displacement (T);
characterized in that the inspection line comprises, each arranged at stations distinct from each other along the trajectory of displacement (T):
   a) at a finish inspection station, a finish inspection installation (200) capable of detecting without contact, by light rays, check-type defects in the neck (5) of the containers, the installation (200) including:
      a1) an inspection area of the finish inspection installation, in which the neck of a container must be located in order to be inspected, said area including a top reference plane (Prefh) intended to coincide with the upper plane of the container under inspection and including a reference axis (A200) intended to coincide with the central axis (A2) of the container for a position of the container under inspection;
      a2) a section (112) of the transport device (11) which ensures, in the inspection area of the installation, the transport of the containers along a rectilinear portion of the trajectory of displacement (T), in a horizontal conveying plane (Pc) perpendicular to the central axis of the containers,
      a3) a series of several directional light emitters (201, 202, . . . , 20n) which are angularly distributed around the reference axis of the installation and which each deliver, in the direction of the inspection area of the installation, a directional light beam along a beam axis (A201, A202, . . . , A20n) specific thereto, such that the inspection area is lighted by the directional light beams at a multitude of distinct azimuth angles in projection in the top reference plane;
      a4) several light receivers (211, 212, . . . , 21n) which are angularly distributed around the reference axis of the installation and which each have an axis of view (A211, A212, . . . , A21n) and a field-of-view angle (AV211, . . . ) around this axis of view;
      a5) with optical elements arranged on either side of the associated reference plane, these optical elements belonging either to light emitters of the installation or to light receivers of the installation, but all outside the conveying volume;
   b) at a base inspection station, a base inspection installation (300) capable of detecting without contact, by light rays, check-type defects in the base (3) of the containers, the installation (300) including:
      b1) an inspection area of the base inspection installation in which the base of a container must be located in order to be inspected, said area including a bottom reference plane (Prefb) intended to coincide with the lower plane of the container under inspection and including a reference axis (A300) intended to coincide with the central axis of the container for a position of the container under inspection;
      b2) a section (113) of the transport device (11) which ensures, in the inspection area of the installation, the transport of the containers along a rectilinear portion of the trajectory of displacement (T), in a horizontal conveying plane (Pc) perpendicular to the central axis of the containers,
      b3) a series of several directional light emitters (301, 302, . . . , 30n) which are angularly distributed around the reference axis of the installation and which each deliver, in the direction of the inspection area of the installation, a directional light beam along a beam axis (A301, A302, . . . , A30n) specific thereto, such that the inspection area is lighted by the directional light beams at a multitude of distinct azimuth angles in projection in the bottom reference plane;
      b4) several photosensitive receivers (311, 312, . . . , 31n) which are angularly distributed around the reference axis of the installation and which each have an axis of view (A311, A312, . . . , A31n) and a field-of-view angle (AV311) around this axis of view;
      b5) with optical elements arranged on either side of the associated bottom reference plane, these optical elements belonging either to light emitters of the installation or to light receivers of the installation, but all outside the conveying volume;

c) at a radiographic measuring station, a radiographic installation (400) for automatically measuring linear dimensions of at least one region to be inspected of containers, having:

c1) at least one focal point (Fj) of an X-ray generating tube (12) located outside the traversed volume (Vt), and creating a divergent X-ray beam directed to pass through at least one region to be inspected comprising at least part the neck and/or part of the body of the container;

c2) a section (114) of the transport device (11) which ensures, in the inspection area of the installation, the transport of the containers along a rectilinear portion of the trajectory of displacement (T), in a horizontal conveying plane (Pc) perpendicular to the central axis of the containers, c3) one or several radiographic image sensors (Ci), located outside the conveying volume (Vt), so as to receive X-rays derived from a focal point (Fj), the focal point(s) (Fj) and the radiographic image sensors (Ci) being disposed such that each image sensor receives the radiographic projection of the region to be inspected by the rays derived from the focal point (9) when the container passes through these rays, the directions of radiographic projection of these radiographic projections being different from each other;

c4) an acquisition system connected to the radiographic image sensors (Ci), so as to acquire for each container during its displacement, at least three radiographic images of the region to be inspected, obtained from at least three radiographic projections of the region to be inspected, with different directions of radiographic projection;

c5) a computer system analyzing the at least three radiographic images, derived from at least the three different radiographic projections, so as to determine at least one inner diameter of the neck in a plane not orthogonal to a direction of radiographic projection (Dji), and/or at least one thickness of the body wall in a plane not orthogonal to a direction of radiographic projection (Dji).

2. The inspection line according to claim 1, characterized in that it includes, at a shoulder and/or body inspection station, distinct from the finish inspection, base inspection and radiographic measuring stations, a shoulder and/or body inspection installation (500) capable of detecting without contact, by light rays, check-type defects in the shoulder and/or body of the containers, the installation (500) including:

d1) an inspection area of the shoulder and/or body inspection installation in which the shoulder and/or the body of a container must be located in order to be inspected, said area including an intermediate reference plane intended to cut the shoulder and/or the body of the container under inspection and including a reference axis (A500) intended to coincide with the central axis of the container for a position of the container under inspection;

d2) a section of the transport device (11) which ensures, in the inspection area of the installation, the transport of the containers along a rectilinear portion of the trajectory of displacement (T), in a horizontal conveying plane (Pc) perpendicular to the central axis of the containers, d3) a series of several directional light emitters which are angularly distributed around the reference axis of the installation and which each deliver, in the direction of the inspection area of the installation, a directional light beam along a beam axis specific thereto, such that the inspection area is lighted by the directional light beams at a multitude of distinct azimuth angles in projection in the intermediate reference plane;

d4) several light receivers which are angularly distributed around the reference axis of the installation and which each have an axis of view and an field-of-view angle around this axis of view;

d5) with optical elements arranged on either side of the intermediate reference plane, these optical elements belonging either to light emitters of the installation or to light receivers of the installation, but all outside the conveying volume.

3. The inspection line according to claim 1, characterized in that in each of the inspection areas of the finish inspection (200), base inspection (300) and radiographic measuring (400) installations, the transport device (11) ensures, in the inspection area of the installation, the transport of the containers along the trajectory of displacement without controlled rotation around their central axis (A2).

4. The inspection line according to claim 1, characterized in that in each of the inspection areas of the finish inspection (200), base inspection (300) and radiographic measuring (400) installations, the transport device (11) ensures, in the inspection area of the installation, the transport of the containers along the trajectory of displacement such that they are stationary in rotation around their central axis (A2).

5. The inspection line according to claim 1, characterized in that, between each of the finish inspection (200), base inspection (300) and radiographic measuring (400) installations, the transport device (11) ensures the transport of the containers along the trajectory of displacement without controlled rotation around their central axis (A2).

6. The inspection line according to claim 1, characterized in that the transport device (11) is formed, at each of the stations, by an associated conveying section (112, 113, 114) of the transport device which ensures the transport of each container (2) through the station while being in contact with the container, and in that one of the conveying sections associated respectively with the finish inspection, base inspection and radiographic measuring stations ensures a contact with a first contact region of the containers, while another of the conveying sections associated respectively with the finish inspection, base inspection and radiographic measuring stations ensures a contact with a second contact region of the containers which is distinct from the first contact region.

7. The inspection line according to claim 6, characterized in that, in each station, the area of contact of the containers with the section of the transport device (11) which is associated with this station is distinct from the area to be inspected of the containers at this station.

8. The inspection line according to claim 1, characterized in that in each of the finish inspection (200), base inspection (300) and radiographic measuring (400) installations, the transport device (11) ensures the transport of the containers without vertical displacement.

9. The inspection line according to claim 1, characterized in that the transport device (11) ensures the transport of the containers (2) without vertical displacement in the inspection line (100), neither in the three finish inspection, base inspection and radiographic measuring stations, nor between the finish inspection, base inspection and radiographic measuring stations.

10. The inspection line according to claim 1, characterized in that the containers (2) are conveyed without controlled rotation around their central axis (A2), neither in the three finish inspection, base inspection and radiographic measuring stations, nor between the finish inspection, base inspection and radiographic measuring stations.

11. The inspection line according to claim 1, characterized in that the finish inspection installation (200) includes optical elements of directional light emitters (201, 202, . . . , 20n) arranged above the top reference plane (Prefh) and optical elements of light emitters (201, 202, . . . , 20n) arranged below the top reference plane (Prefh), but outside the conveying volume (Vt).

12. The inspection line according to claim 1, characterized in that the finish inspection installation (200) includes optical elements of light receivers (211, 212, . . . , 21n) arranged above the top reference plane (Prefh) and optical elements of light receivers (211, 212, . . . , 21n) arranged below the top reference plane (Prefh), but outside the conveying volume (Vt).

13. The inspection line according to claim 1, characterized in that the base inspection installation (300) includes optical elements of directional light emitters (301, 302, . . . , 30n) arranged below the bottom reference plane (Prefb) and optical elements of directional light emitters (301, 302, . . . , 30n) arranged above the bottom reference plane (Prefb), but outside the conveying volume (Vt).

14. The inspection line according to claim 1, characterized in that the base inspection installation (300) includes optical elements of light receivers (311, 312, . . . , 31n) arranged below the bottom reference plane (Prefb) and optical elements of light receivers (311, 312, 31n) arranged above the bottom reference plane (Prefb), but outside the conveying volume (Vt).

15. The inspection line according to claim 1, characterized in that the inspection installation (200, 300) includes directional light emitters (201, 202, . . . , 20n, 301, 302, . . . , 30n) which are distributed such that the inspection area is lighted by the directional light beams at a multitude of distinct elevation angles relative to the reference plane (Prefh, Prefb).

16. The inspection line according to claim 1, characterized in that each container (2) of the series of containers carries a unique identifier, in that the inspection line (100) includes at least one reader of the unique identifier of the containers inspected by the inspection line, and in that the inspection line includes a computer system (600) which receives:
from the finish inspection installation (200), at least one finish inspection information for the inspected container;
from the base inspection installation (300), at least one base inspection information for the inspected container;
from the radiographic measuring installation (400), at least one linear dimension measurement for the inspected container, and in that the computer system (600) of the inspection line is configured to create a computer report linking the unique identifier of a container (2), the at least one finish inspection information, the at least one base inspection information and the at least one measurement for that inspected container, and to store this computer report in an electronic memory.

17. The inspection line according to claim 2, wherein each container (2) of the series of containers carries a unique identifier, in that the inspection line (100) includes at least one reader of the unique identifier of the containers inspected by the inspection line, and in that the inspection line includes a computer system (600) which receives:
from the finish inspection installation (200), at least one finish inspection information for the inspected container:
from the base inspection installation (300), at least one base inspection information for the inspected container:
from the radiographic measuring installation (400), at least one linear dimension measurement for the inspected container, and in that the computer system (600) of the inspection line is configured to create a computer report linking the unique identifier of a container (2), the at least one finish inspection information, the at least one base inspection information and the at least one measurement for that inspected container, and to store this computer report in an electronic memory, and further wherein the computer system (600) of the inspection line (100) receives, from the shoulder and/or body inspection installation (500), at least one shoulder and/or body inspection information for the inspected container which is related to the other information in the computer report.

18. The inspection line according to claim 16, characterized in that the computer system (600) of the inspection line (100) is configured to perform a computer processing on the computer reports of a group of containers of the series.

19. The inspection line according to claim 16, characterized in that the computer system (600) of the inspection line (100) is configured to control a corrective action on a parameter of production of the containers, based on a computer processing on the computer reports of a group of containers of the series.

20. The inspection line according to claim 1, characterized in that the determination of at least one inner diameter of the neck and/or at least one thickness of the body wall includes the construction, for each container, a digital geometric model of the region to be inspected of the container.

21. The inspection line according to claim 20, characterized in that said digital geometric model contains the three-dimensional coordinates of a set of points, calculated from the at least three radiographic images, this set of points belonging to the inner and/or outer surface of the wall of the container, with at least two points located in a plane not orthogonal to a direction of radiographic projection (Dji), and in that the at least one inner diameter of the neck, and/or the at least one thickness of the wall of the measured body are measured on the digital geometric model in a plane not orthogonal to a direction of radiographic projection (Dji).

* * * * *